US011963916B2

(12) United States Patent
Tessmer et al.

(10) Patent No.: US 11,963,916 B2
(45) Date of Patent: Apr. 23, 2024

(54) TRACK ASSEMBLY FOR PATIENT TRANSPORT APPARATUS

(71) Applicant: Stryker Corporation, Kalamazoo, MI (US)

(72) Inventors: Brian J. Tessmer, Mattawan, MI (US); Nathan W. Matheny, Portage, MI (US)

(73) Assignee: Stryker Corporation, Kalamazoo, MI (US)

( * ) Notice: Subject to any disclaimer, the term of this patent is extended or adjusted under 35 U.S.C. 154(b) by 523 days.

(21) Appl. No.: 17/131,935

(22) Filed: Dec. 23, 2020

(65) Prior Publication Data

US 2021/0196536 A1 Jul. 1, 2021

Related U.S. Application Data

(60) Provisional application No. 62/954,935, filed on Dec. 30, 2019.

(51) Int. Cl.
*A61G 5/06* (2006.01)

(52) U.S. Cl.
CPC ............. *A61G 5/061* (2013.01); *A61G 5/066* (2013.01)

(58) Field of Classification Search
CPC ......... A61G 5/061; A61G 5/066; B62D 55/30
(Continued)

(56) References Cited

U.S. PATENT DOCUMENTS 2,319,008 A 5/1943 McCormack
2,931,449 A 4/1960 King
(Continued)

FOREIGN PATENT DOCUMENTS

AU 1742699 A 5/1999
CA 2122515 A1 10/1995
(Continued)

OTHER PUBLICATIONS

Addady, Michael, "This Wheelchair is Like a Segway Crossed with a Tank, and it Can Climb Stairs", Oct. 19, 2015, article and video downloaded from http://fortune.com/2015/10/19/Wheelchair-climb-stairs/, 2 pages.

Amazon.com, "LINE2 Design Battery Powered Track Stair Chair 70019-Y-BAT Heavy Duty Emergency Lightweight Portable Folding Evacuation Chair", 2019, https://www.amazon.com/LINE2design-70019-Y-BAT-Emergency-Lightweigh- t-Evacuation/dp/B07MDHF4CP, 8pages.

(Continued)

*Primary Examiner* — Minnah L Seoh
*Assistant Examiner* — Felicia L. Brittman
(74) *Attorney, Agent, or Firm* — Howard & Howard Attorneys PLLC

(57) ABSTRACT

A track assembly for a patient transport apparatus, comprising a rail defining a first end and a second end, an axle defining an axis, a roller supported about the axis, and a belt engaging roller and arranged for movement relative to the rail in response to rotation of the roller. A guide supports the axle for movement. A keeper coupled to the axle is operable between a disengaged configuration to permit movement of the axle, and an engaged configuration to restrict movement. A brace is operatively attached to the rail adjacent to the guide. A tensioning cam coupled to the axle defines a plurality of relief catches arranged for engagement with the brace. The relief catches are each shaped to remain in selective engagement with the brace effected by concurrent movement of the axle and the tensioning cam to tension the belt against the roller in the disengaged configuration.

17 Claims, 34 Drawing Sheets

(58) Field of Classification Search
USPC .......................................................... 180/8.2
See application file for complete search history.

(56) References Cited

U.S. PATENT DOCUMENTS

| | | | |
|---|---|---|---|
| 3,111,331 A | 11/1963 | Locke | |
| 3,127,188 A | 3/1964 | Greub | |
| 3,146,841 A | 9/1964 | Locke | |
| 3,191,196 A | 6/1965 | Holm | |
| 3,191,953 A | 6/1965 | Aysta | |
| 3,195,910 A | 7/1965 | Steiner | |
| 3,198,534 A | 8/1965 | Robinson | |
| 3,231,290 A | 1/1966 | Weyer | |
| 3,276,531 A | 10/1966 | Hale | |
| 3,529,688 A | 9/1970 | Bruce | |
| 4,044,850 A | 8/1977 | Winsor | |
| 4,136,888 A | 1/1979 | Bowie, Jr. et al. | |
| 4,401,178 A | 8/1983 | Studer | |
| 4,411,330 A | 10/1983 | Blokland | |
| 4,432,425 A | 2/1984 | Nitzberg | |
| 4,556,229 A | 12/1985 | Bihler et al. | |
| 4,566,706 A | 1/1986 | Bihler et al. | |
| 4,566,707 A | 1/1986 | Nitzberg | |
| 4,627,508 A | 12/1986 | Auer | |
| 4,771,839 A | 9/1988 | Misawa | |
| 4,962,941 A | 10/1990 | Rembos | |
| 5,036,929 A | 8/1991 | Trougouboff | |
| 5,123,495 A | 6/1992 | Littlejohn et al. | |
| 5,158,309 A | 10/1992 | Quigg | |
| 5,197,558 A | 3/1993 | Misawa | |
| 5,248,007 A | 9/1993 | Watkins et al. | |
| 5,335,741 A | 8/1994 | Rabinovitz et al. | |
| 5,338,048 A | 8/1994 | Medina | |
| 5,423,563 A | 6/1995 | Wild | |
| 5,515,561 A | 5/1996 | Suggitt et al. | |
| 5,641,030 A | 6/1997 | Toselli | |
| 5,868,403 A | 2/1999 | Culp et al. | |
| 5,895,332 A * | 4/1999 | Olson | B65G 23/44 198/813 |
| 6,341,784 B1 | 1/2002 | Carstens | |
| 6,484,829 B1 | 11/2002 | Cox | |
| 6,594,837 B2 | 7/2003 | Khait | |
| 6,644,426 B1 | 11/2003 | Larue | |
| 6,644,675 B2 | 11/2003 | Ellis et al. | |
| 6,648,343 B2 | 11/2003 | Way et al. | |
| 6,805,209 B2 | 10/2004 | Hedeen | |
| 6,857,490 B2 | 2/2005 | Quigg | |
| 7,383,611 B2 | 6/2008 | Foster | |
| 7,398,571 B2 | 7/2008 | Souke et al. | |
| 7,472,438 B2 | 1/2009 | Karmer, Jr. et al. | |
| 7,520,347 B2 | 4/2009 | Chambliss et al. | |
| 7,581,265 B1 | 9/2009 | Bourgraf et al. | |
| 7,940,187 B2 | 5/2011 | Newham | |
| 7,950,673 B2 | 5/2011 | Reed et al. | |
| 8,056,950 B2 | 11/2011 | Souke et al. | |
| 8,061,460 B2 | 11/2011 | Scheck | |
| 8,104,121 B2 | 1/2012 | Bourgraf et al. | |
| 8,175,507 B2 * | 5/2012 | Wing | G03G 15/1615 399/302 |
| 8,307,473 B1 | 11/2012 | Lambarth et al. | |
| 8,371,403 B2 | 2/2013 | Underwood | |
| 8,640,798 B2 | 2/2014 | Walkingshaw et al. | |
| 8,720,616 B2 | 5/2014 | Kofoed et al. | |
| 8,856,982 B1 | 10/2014 | Kalivas | |
| 8,910,329 B2 | 12/2014 | Turner et al. | |
| 8,959,681 B2 | 2/2015 | Richards | |
| 9,004,204 B2 | 4/2015 | Walkingshaw et al. | |
| 9,486,373 B2 | 11/2016 | Lambarth et al. | |
| 9,510,981 B2 | 12/2016 | Lambarth et al. | |
| 9,593,833 B2 | 3/2017 | McMannon et al. | |
| 10,744,049 B2 | 8/2020 | Naber et al. | |
| 10,758,437 B2 | 9/2020 | Lucas et al. | |
| 10,857,047 B2 | 12/2020 | Furman et al. | |
| 11,535,455 B1 * | 12/2022 | Ertel | B65G 23/44 |
| 2003/0132585 A1 | 7/2003 | Way et al. | |
| 2003/0141677 A1 | 7/2003 | Medina | |
| 2003/0159859 A1 * | 8/2003 | Boivin | B62D 55/04 180/9.26 |
| 2003/0183428 A1 | 10/2003 | Hedeen | |
| 2006/0037789 A1 | 2/2006 | Kritman et al. | |
| 2006/0038360 A1 | 2/2006 | Negishi | |
| 2006/0076739 A1 | 4/2006 | Kikusato | |
| 2006/0124366 A1 | 6/2006 | Le Masne De Chermont | |
| 2007/0095581 A1 | 5/2007 | Chambliss et al. | |
| 2008/0011524 A1 * | 1/2008 | Despres | B62D 55/125 180/9.21 |
| 2008/0067762 A1 | 3/2008 | Rembos et al. | |
| 2008/0202292 A1 * | 8/2008 | Gilgallon | B25B 25/00 81/57.29 |
| 2008/0272629 A1 | 11/2008 | Walkingshaw et al. | |
| 2009/0230638 A1 | 9/2009 | Reed et al. | |
| 2010/0104818 A1 | 4/2010 | Uto | |
| 2010/0117312 A1 | 5/2010 | Walkingshaw et al. | |
| 2011/0080016 A1 | 4/2011 | Lambarth et al. | |
| 2011/0087113 A1 | 4/2011 | Mack et al. | |
| 2011/0175302 A1 | 7/2011 | Sherman et al. | |
| 2011/0263950 A1 | 10/2011 | Larson et al. | |
| 2012/0139197 A1 | 6/2012 | Livingston | |
| 2012/0283929 A1 | 11/2012 | Wakita et al. | |
| 2013/0026737 A1 | 1/2013 | Pizzi Spadoni | |
| 2013/0081885 A1 | 4/2013 | Connor | |
| 2013/0085632 A1 | 4/2013 | De Laurentis et al. | |
| 2013/0175770 A1 | 7/2013 | Morrish et al. | |
| 2013/0274973 A1 | 10/2013 | Kamara et al. | |
| 2014/0007346 A1 | 1/2014 | Lachenbruch | |
| 2014/0021006 A1 | 1/2014 | Kamara et al. | |
| 2014/0054139 A1 * | 2/2014 | Ogata | B65G 15/64 198/806 |
| 2014/0084553 A1 | 3/2014 | Carletti | |
| 2014/0090171 A1 | 4/2014 | Hyde et al. | |
| 2014/0259420 A1 | 9/2014 | Lambarth et al. | |
| 2014/0265181 A1 | 9/2014 | Lambarth et al. | |
| 2014/0299391 A1 | 10/2014 | Carletti | |
| 2014/0310876 A1 | 10/2014 | Roussy et al. | |
| 2015/0096815 A1 | 4/2015 | Ottenweller et al. | |
| 2015/0137988 A1 | 5/2015 | Gravenstein et al. | |
| 2015/0216474 A1 | 8/2015 | Riley et al. | |
| 2015/0251713 A1 | 9/2015 | Couture et al. | |
| 2015/0329292 A1 * | 11/2015 | Kawanami | G03G 15/161 198/813 |
| 2016/0140307 A1 | 5/2016 | Brosnan et al. | |
| 2016/0176453 A1 | 6/2016 | Rudakevych | |
| 2017/0035628 A1 | 2/2017 | Naber et al. | |
| 2017/0079859 A1 | 3/2017 | Lambarth et al. | |
| 2017/0143566 A1 | 5/2017 | Elku et al. | |
| 2017/0172827 A1 | 6/2017 | Schaaf et al. | |
| 2017/0281440 A1 | 10/2017 | Puvogel et al. | |
| 2018/0021191 A1 | 1/2018 | Lambarth et al. | |
| 2018/0028377 A1 | 2/2018 | Stryker et al. | |
| 2018/0028383 A1 | 2/2018 | Stryker et al. | |
| 2018/0177652 A1 | 6/2018 | Furman et al. | |
| 2018/0185212 A1 * | 7/2018 | Lucas | A61G 5/061 |
| 2018/0185213 A1 | 7/2018 | Naber et al. | |
| 2019/0209404 A1 | 7/2019 | Kuhnl-Kinel | |
| 2019/0307261 A1 | 10/2019 | Gervais | |
| 2019/0350782 A1 | 11/2019 | Wang | |
| 2020/0345566 A1 | 11/2020 | Naber et al. | |
| 2020/0345567 A1 | 11/2020 | Lucas et al. | |
| 2021/0045946 A1 | 2/2021 | Furman et al. | |

FOREIGN PATENT DOCUMENTS

| | | | |
|---|---|---|---|
| CA | 2122686 | A1 | 11/1995 |
| CA | 2746194 | C | 10/2014 |
| CN | 1152863 | A | 6/1997 |
| CN | 104887425 | A | 9/2015 |
| CN | 204915772 | U | 12/2015 |
| EP | 1789278 | A2 | 5/2007 |
| EP | 1965679 | A2 | 9/2008 |
| EP | 1214035 | B1 | 3/2010 |
| EP | 2105117 | B1 | 12/2011 |
| EP | 2595707 | A1 | 5/2013 |
| EP | 2910226 | A1 | 8/2015 |

(56) References Cited

FOREIGN PATENT DOCUMENTS

| | | | |
|---|---|---|---|
| GB | 1486991 | A | 9/1977 |
| GB | 2429192 | A | 2/2007 |
| GB | 2499241 | A | 8/2013 |
| JP | 4896358 | B2 | 3/2012 |
| JP | 5055523 | B2 | 10/2012 |
| JP | 5878877 | B2 | 3/2016 |
| TW | 201019894 | A | 6/2010 |
| WO | 9834577 | A1 | 8/1998 |
| WO | 0119313 | A1 | 3/2001 |
| WO | 2004022371 | A2 | 3/2004 |
| WO | 2006023447 | A2 | 3/2006 |
| WO | 2007022037 | A1 | 2/2007 |
| WO | 2007075701 | A2 | 7/2007 |
| WO | 2008127944 | A1 | 10/2008 |
| WO | 2011101422 | A1 | 8/2011 |
| WO | 2011113070 | A1 | 9/2011 |
| WO | 2015032003 | A1 | 3/2015 |
| WO | 2016108582 | A1 | 7/2016 |
| WO | 2018047450 | A1 | 3/2018 |

OTHER PUBLICATIONS

Bouckley, Hanna, "The Wheelchair That Can Travel Up Stairs", 2016, downloaded from http://home.bt.com/tech-gadgets/tech-news/the-wheelchair-that-can-travel-up-stairs-11364035427656, 2 pages.

English language abstract and machine-assisted English translation for CN 104887425 extracted from espacenet.com database on Jun. 20, 2018, 10 pages.

English language abstract and machine-assisted English translation for CN 204915772 extracted from espacenet.com database on Jun. 6, 2018, 14 pages.

English language abstract and machine-assisted English translation for TW 201019894 extracted from espacenet.com database on Jun. 20, 2018, 12 pages.

English language abstract and machine-assisted English translation for WO 2016108582 extracted from espacenet.com database on Jun. 20, 2018, 23 pages.

English language abstract for CN 1152863 extracted from espacenet.com database on Jun. 20, 2018, 2 pages.

English language abstract for JP 4896358 extracted from espacenet.com database on Jun. 20, 2018, 1 page.

English language abstract for JP 5055523 extracted from espacenet.com database on Jun. 20, 2018, 1 page.

English language abstract for JP 5878877 extracted from espacenet.com database on Jun. 6, 2018, 2 pages.

Gomes, Carlos, "Using LabVIEW and MyRIO, We Created a Wheelchair That Can Improve the Lives of Disabled People and Give Them the Mobility Everyone Deserves", 2016, Case Study and Video downloaded from http://sine.ni.com/cs/app/doc/p/id/cs-16829, 2pages.

Mobile Stairlift, "Mobile Stairlift & Accessories Webpage", 2019, https://www.mobilestairlift.com/products/mobile-stairlift-battery-powered-portable, 4 pages.

Mobile Stairlift, "Mobile Stairlift Motorized Chair Lift—Battery Powered Webpage", 2019, https://www.mobilestairlift.com/collections/mobile-stairlift-accessories, 5 pages.

Promeba, S.L., "Promeba Emergency & Rescue-Chair PS-250/ Power Track PA-260/Support PA-270 Catalog",http://promeba.com/wp-content/uploads/2017/05/Cataleg_Promeba_PS-250_v01 _- BR.pdf, Jan. 2017, 16 pages.

Robo Rats, "Robo-Rats Locomotion: Differential Drive", Apr. 4, 2001, downloaded from https://groups.csail.mit.edu/drl/courses/cs54-2001s/diffdrive.html, 2 pages.

The Gadget Flow, "SCEWO Stair Climbing Wheelchair", 2017, downloaded from https://thegadgetflow.com/portfolio/scewo-stair-climbing-wheelchair/, 3 pages.

Topchair France, "Photo of Stair-Climbing Wheelchair" 2015, downloaded from http://www.topchair.fr/wp-content/uploads/2015/07/Topchair-S-fauteuil-electrique-escalier-e1453809380620.jpg, 1 page.

Topchair, "Topchair-S Stair-Climbing Wheelchair User Guide", May 2014, 54 pages.

Youtube, "How to Use the Mobile Stairlift Dolly—An Introductory Guide Video", Apr. 10, 2018, https://www.youtube.com/watch?v=BQt3-q73Zyg, 2 pages.

Youtube, "Introducing the Mobile Stairlift-Portable Stair Climbing Wheelchair Video", Apr. 10, 2018, https://www.youtube.com/watch?v=QhBhuuoeyd4, 3 pages.

Youtube, "ST003A Plus New Type Mobility Stair Climber Chair for Lifting Elderly Video", Apr. 5, 2018, https://www.youtube.com/watch?v=_ltZ1Nbpf-0, 2 pages.

English language abstract and machine-assisted English translation for WO 2018/047450 A1 extracted from espacenet.com database on Feb. 15, 2021, 11 pages.

* cited by examiner

TRACK ASSEMBLY FOR PATIENT TRANSPORT APPARATUS

CROSS-REFERENCE TO RELATED APPLICATION

This application claims priority to and all the benefits of U.S. Provisional Patent Application No. 62/954,935, filed on Dec. 30, 2019.

BACKGROUND

In many instances, patients with limited mobility may have difficulty traversing stairs without assistance. In certain emergency situations, traversing stairs may be the only viable option for exiting a building. In order for a caregiver to transport a patient along stairs in a safe and controlled manner, a stair chair or evacuation chair may be utilized. Stair chairs are adapted to transport seated patients either up or down stairs, with two caregivers typically supporting, stabilizing, or otherwise carrying the stair chair with the patient supported thereon.

Conventional stair chairs may employ tracks to assist in ascending and/or descending stairs, and wheels to traverse floor surfaces. The tracks utilize movable belts which contact stairs to facilitate movement between multiple stairs. However, belts utilized in these types of stair chairs can be difficult to tighten, such as during manufacture or service. Here, users wishing to adjust tension in the belts frequently have to utilize multiple tools to hold and lock tension in the belt.

A patient transport apparatus designed to overcome one or more of the aforementioned challenges is desired.

BRIEF DESCRIPTION OF THE DRAWINGS

Other advantages of the present invention will be readily appreciated as the same becomes better understood by reference to the following detailed description when considered in connection with the accompanying drawings.

DETAILED DESCRIPTION OF THE EMBODIMENTS

Figure 1:
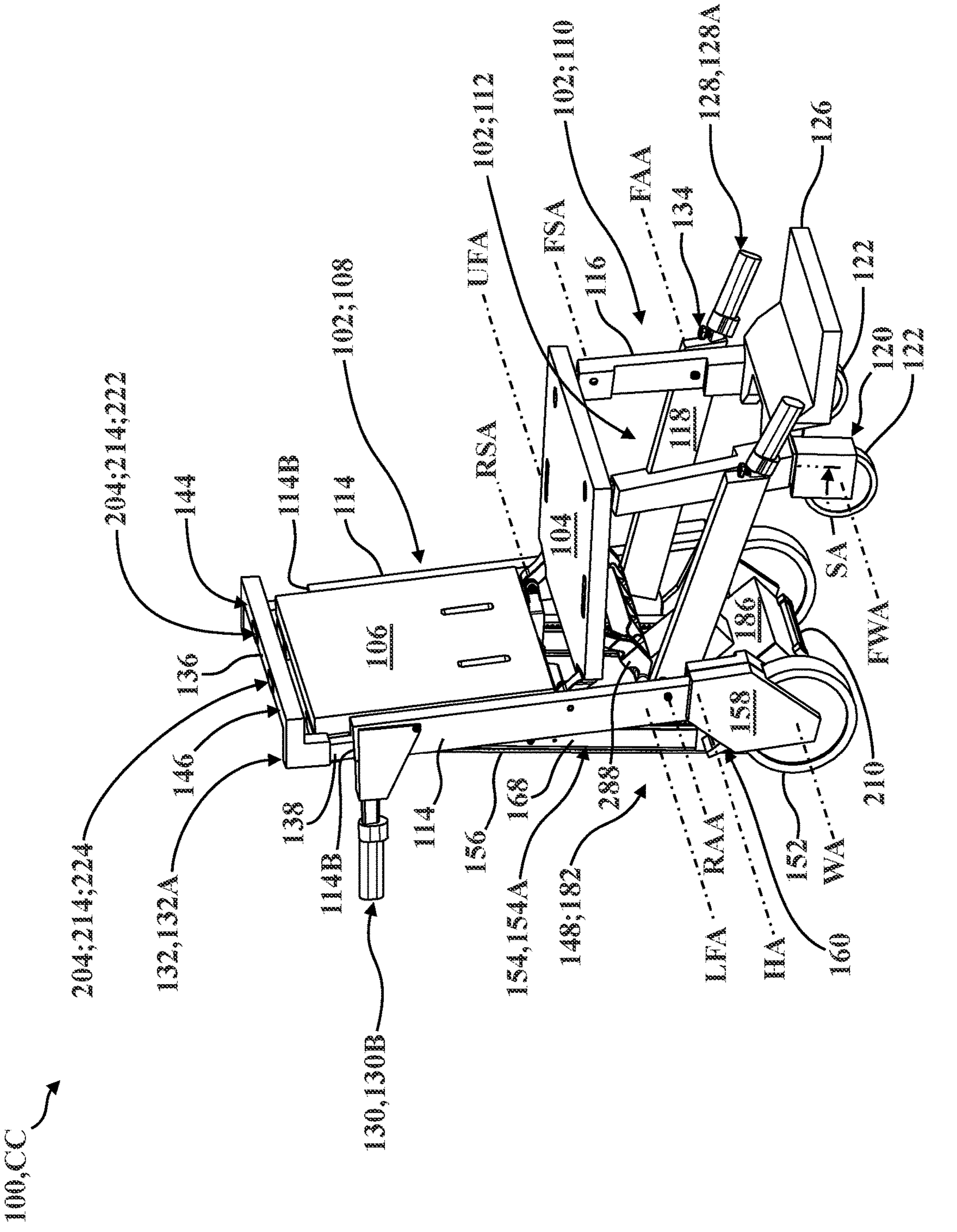
FIG. 1 is a front perspective view of a patient transport apparatus according to the present disclosure, shown arranged in a chair configuration for supporting a patient for transport along a floor surface, and shown having a track assembly disposed in a retracted position, and a handle assembly disposed in a collapsed position.

Referring now to the drawings, wherein like numerals indicate like parts throughout the several views, the present disclosure is generally directed toward a patient transport apparatus 100 configured to allow one or more caregivers to transport a patient. To this end, the patient transport apparatus 100 is realized as a "stair chair" which can be operated in a chair configuration CC (see FIGS. 1 and 6A) to transport the patient across ground or floor surfaces FS (e.g., pavement, hallways, and the like), as well as in a stair configuration SC (see FIGS. 2 and 6B) to transport the patient along stairs ST. As will be appreciated from the subsequent description below, the patient transport apparatus 100 of the present disclosure is also configured to be operable in a stowed configuration WC (see FIG. 5) when not being utilized to transport patients (e.g., for storage in an ambulance).

As is best shown in FIG. 1, the patient transport apparatus 100 comprises a support structure 102 to which a seat section 104 and a back section 106 are operatively attached. The seat section 104 and the back section 106 are each shaped and arranged to provide support to the patient during transport. The support structure 102 generally includes a rear support assembly 108, a front support assembly 110, and an intermediate support assembly 112 that is. The back section 106 is coupled to the rear support assembly 108 for concurrent movement. To this end, the rear support assembly 108 comprises rear uprights 114 which extend generally vertically and are secured to the back section 106 such as with fasteners (not shown in detail). The rear uprights 114 are spaced generally laterally from each other in the illustrated embodiments, and are formed from separate components which cooperate to generally define the rear support assembly 108. However, those having ordinary skill in the art will appreciate that other configurations are contemplated, and the rear support assembly 108 could comprise or otherwise be defined by any suitable number of components. The front support assembly 110 comprises front struts 116 which, like the rear uprights 114, are spaced laterally from each other and extend generally vertically. The intermediate support assembly 112 comprises intermediate arms 118 which are also spaced laterally from each other. Here too, it will be appreciated that other configurations are contemplated, and the front support assembly 110 and/or the intermediate support assembly 112 could comprise or otherwise be defined by any suitable number of components.

The intermediate support assembly 112 and the seat section 104 are each pivotably coupled to the rear support assembly 108. More specifically, the seat section 104 is arranged so as to pivot about a rear seat axis RSA which extends through the rear uprights 114 (compare FIGS. 5-6A; pivoting about rear seat axis RSA not shown in detail), and the intermediate arms 118 of the intermediate support assembly 112 are arranged so as to pivot about a rear arm axis RAA which is spaced from the rear seat axis RSA and also extends through the rear uprights 114 (compare FIGS. 5-6A; pivoting about rear arm axis RAA not shown in detail). Furthermore, the intermediate support assembly 112 and the seat section 104 are also each pivotably coupled to the front support assembly 110. Here, the seat section 104 pivots about a front seat axis FSA which extends through the front struts 116 (compare FIGS. 5-6A; pivoting about front seat axis FSA not shown in detail), and the intermediate arms 118 pivot about a front arm axis FAA which is spaced from the front seat axis FSA and extends through the front struts 116 (compare FIGS. 5-6A; pivoting about front arm axis FAA not shown in detail). The intermediate support assembly 112 is disposed generally vertically below the seat section 104 such that the rear support assembly 108, the front support assembly 110, the intermediate support assembly 112, and the seat section 104 generally define a four-bar linkage which helps facilitate movement between the stowed configuration WC (see FIG. 5) and the chair configuration CC (see FIG. 6A). While the seat section 104 is generally configured to remain stationary relative to the support structure 102 when operating in the chair configuration CC or in the stair configuration CC according to the illustrated embodiments, it is contemplated that the seat section 104 could comprise multiple components which cooperate to facilitate "sliding" movement relative to the seat section 104 under certain operating conditions, such as to position the patient's center of gravity advantageously for transport. Other configurations are contemplated.

Figure 2:
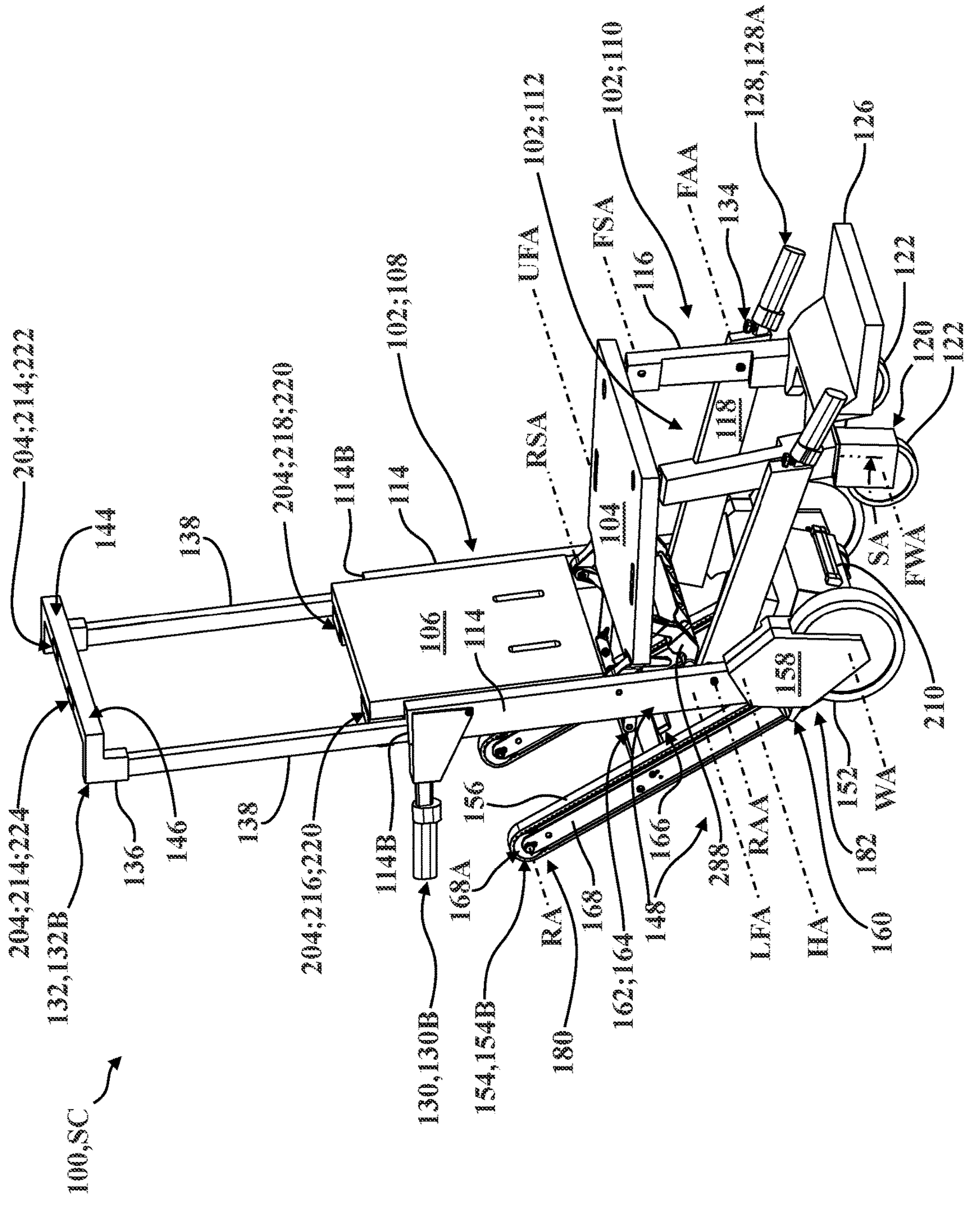
FIG. 2 is another front perspective view of the patient transport apparatus of FIG. 1, shown arranged in a stair configuration for supporting the patient for transport along stairs, and shown with the track assembly disposed in a deployed position, and with the handle assembly disposed in an extended position.
Figure 3:
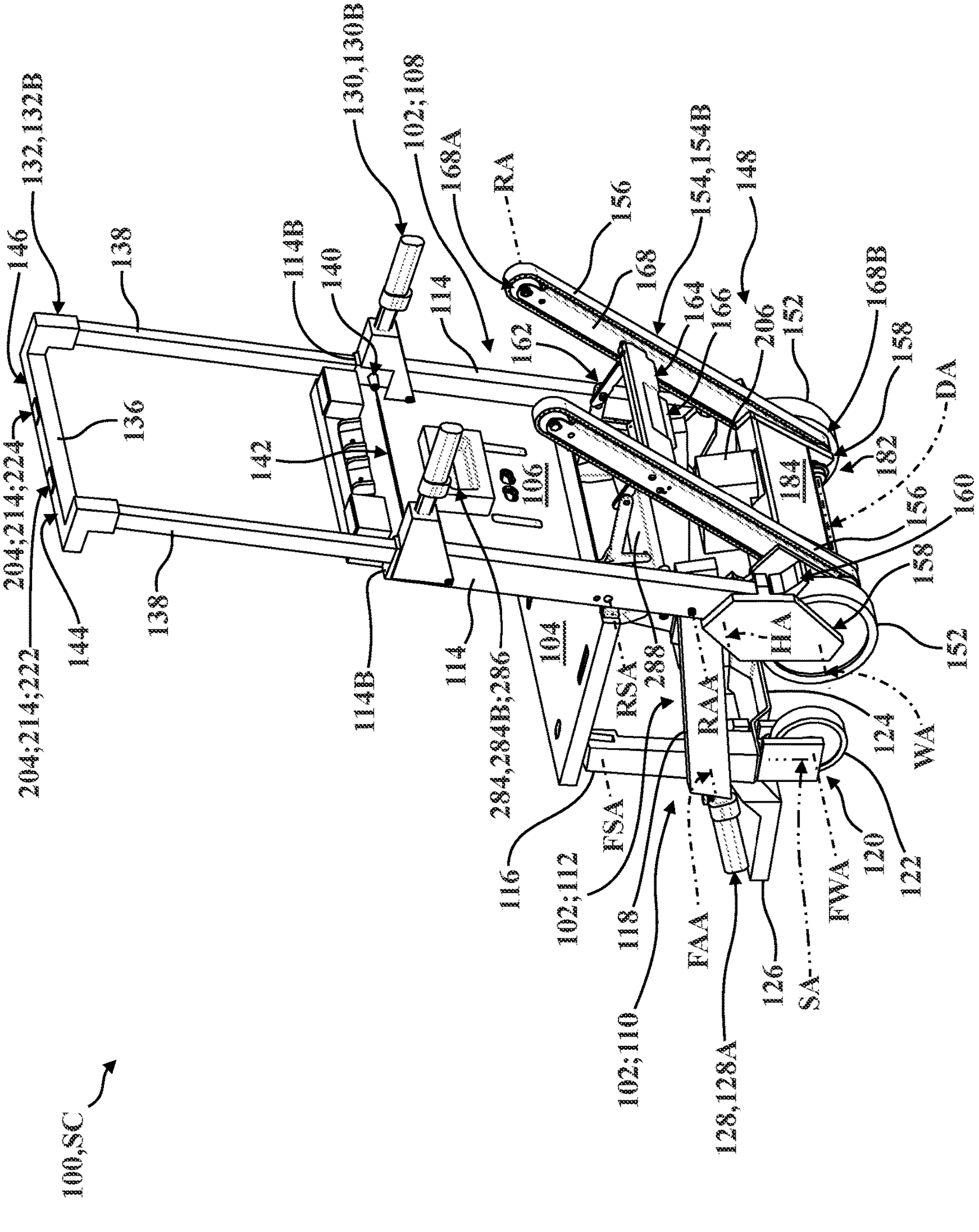
FIG. 3 is a rear perspective view of the patient transport apparatus of FIGS. 1-2, shown arranged in the stair configuration as depicted in FIG. 2, and shown having an extension lock mechanism, a folding lock mechanism, and a deployment lock mechanism.
Figure 5:
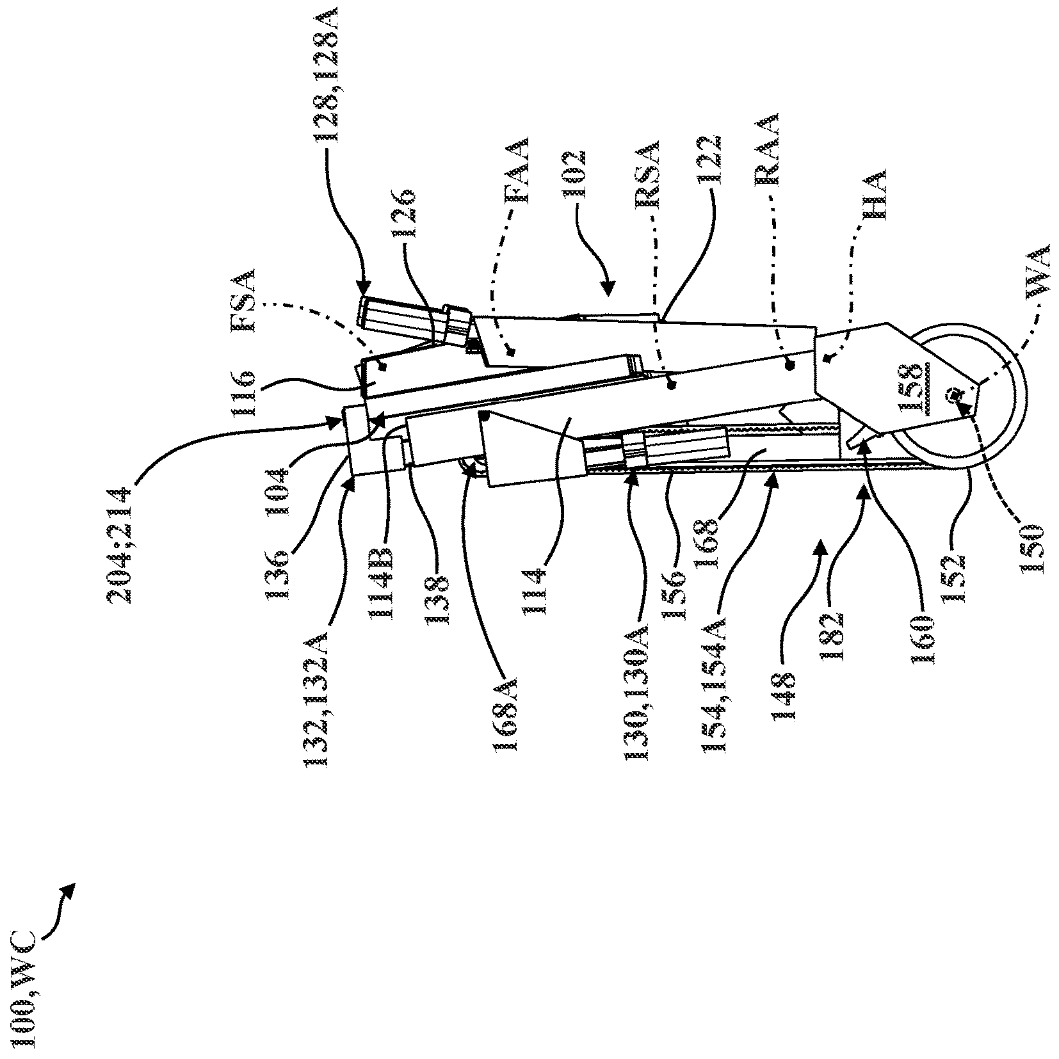
FIG. 5 is a right-side plan view of the patient transport apparatus of FIGS. 1-4, shown arranged in a stowed configuration maintained by the folding lock mechanism.
Figure 6A:
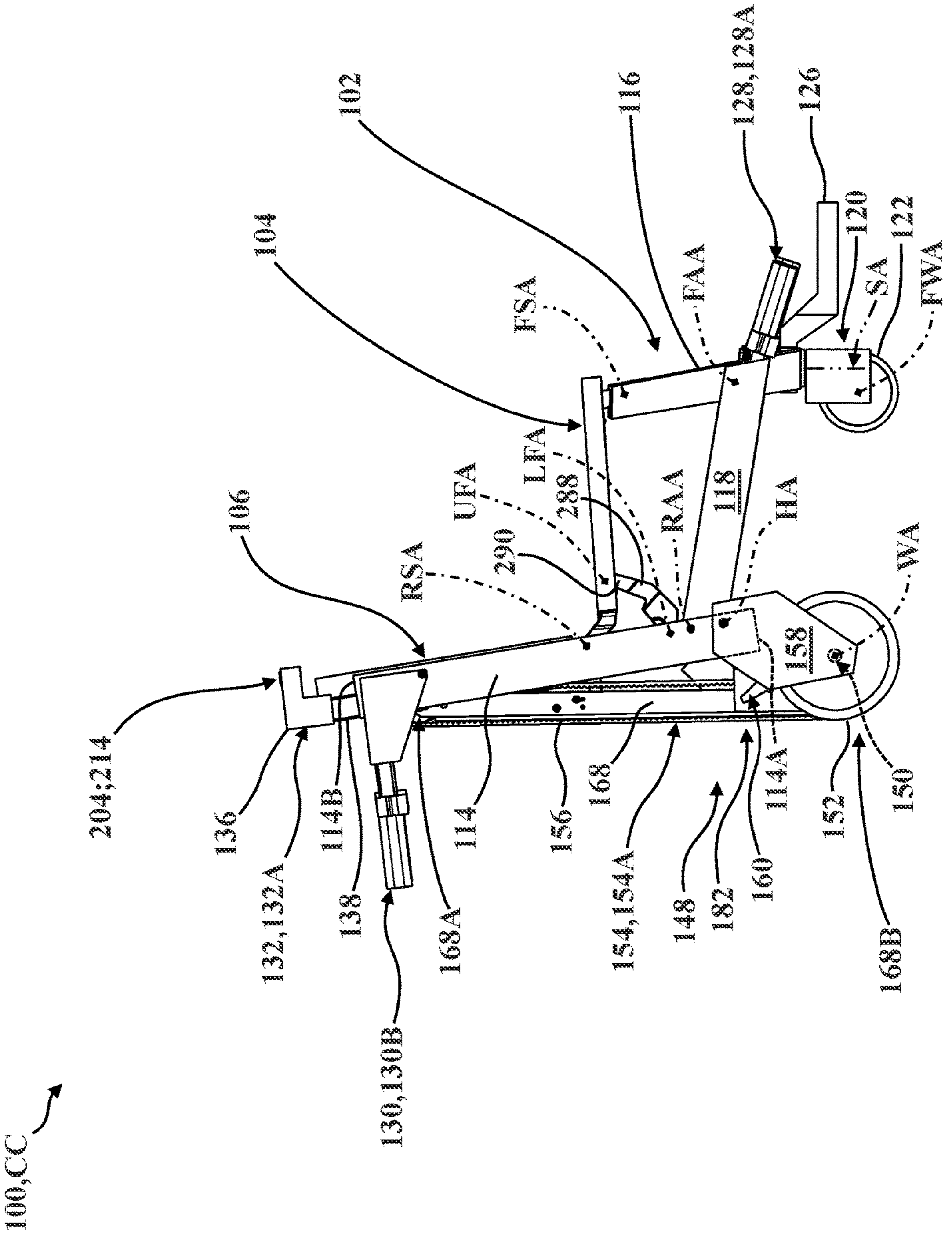
FIG. 6A is another right-side plan view of the patient transport apparatus of FIG. 5, shown arranged in the chair configuration as depicted in FIG. 1.

Referring now to FIGS. 1-3, the front support assembly 110 includes a pair of caster assemblies 120 which each comprise a front wheel 122 arranged to rotate about a respective front wheel axis FWA and to pivot about a respective swivel axis SA (compare FIGS. 5-6A; pivoting about swivel axis SA not shown in detail). The caster assemblies 120 are generally arranged on opposing lateral sides of the front support assembly 110 and are operatively attached to the front struts 116. A lateral brace 124 (see FIG. 3) extends laterally between the front struts 116 to, among other things, afford rigidity to the support structure 102. Here, a foot rest 126 is pivotably coupled to each of the front struts 116 adjacent to the caster assemblies 120 (pivoting not shown in detail) to provide support to the patient's feet during transport. For each of the pivotable connections disclosed herein, it will be appreciated that one or more fasteners, bushings, bearings, washers, spacers, and the like may be provided to facilitate smooth pivoting motion between various components.

The representative embodiments of the patient transport apparatus 100 illustrated throughout the drawings comprise different handles arranged for engagement by caregivers during patient transport. More specifically, the patient transport apparatus 100 comprises front handle assemblies 128, pivoting handle assemblies 130, and an upper handle assembly 132 (hereinafter referred to as "handle assembly 132), each of which will be described in greater detail below. The front handle assemblies 128 are supported within the respective intermediate arms 118 for movement between a collapsed position 128A (see FIG. 12A) and an extended position 128B (see FIG. 12B). To this end, the front handle assemblies 128 may be slidably supported by bushings, bearings, and the like (not shown) coupled to the intermediate arms 118, and may be lockable in and/or between the collapsed position 128A and the extended position 128B via respective front handle locks 134 (see FIG. 1). Here, a caregiver may engage the front handle locks 134 (not shown in detail) to facilitate moving the front handle assemblies 128 between the collapsed position 128A and the extended position 128B. The front handle assemblies 128 are generally arranged so as to be engaged by a caregiver during patient transport up or down stairs ST when in the extended position 128B. It will be appreciated that the front handle assemblies 128 could be of various types, styles, and/or configurations suitable to be engaged by caregivers to support the patient transport apparatus 100 for movement. While the illustrated front handle assemblies 128 are arranged for telescoping movement, other configurations are contemplated. By way of non-limiting example, the front handle assemblies 128 could be pivotably coupled to the support structure 102 or other parts of the patient transport apparatus 100. In some embodiments, the front handle assemblies 128 could be configured similar to as is disclosed in U.S. Pat. No. 6,648,343, the disclosure of which is hereby incorporated by reference in its entirety.

The pivoting handle assemblies 130 are coupled to the respective rear uprights 114 of the rear support assembly 108, and are movable relative to the rear uprights 114 between a stowed position 130A (see FIG. 5) and an engagement position 130B (see FIG. 6A). Like the front handle assemblies 128, the pivoting handle assemblies 130 are generally arranged for engagement by a caregiver during patient transport, and may advantageously be utilized in the engagement position 130B when the patient transport apparatus 100 operates in the chair configuration CC to transport the patient along floor surfaces FS. In some embodiments, the pivoting handle assemblies 130 could be configured similar to as is disclosed in U.S. Pat. No. 6,648,343, previously referenced. Other configurations are contemplated.

Figure 12A:
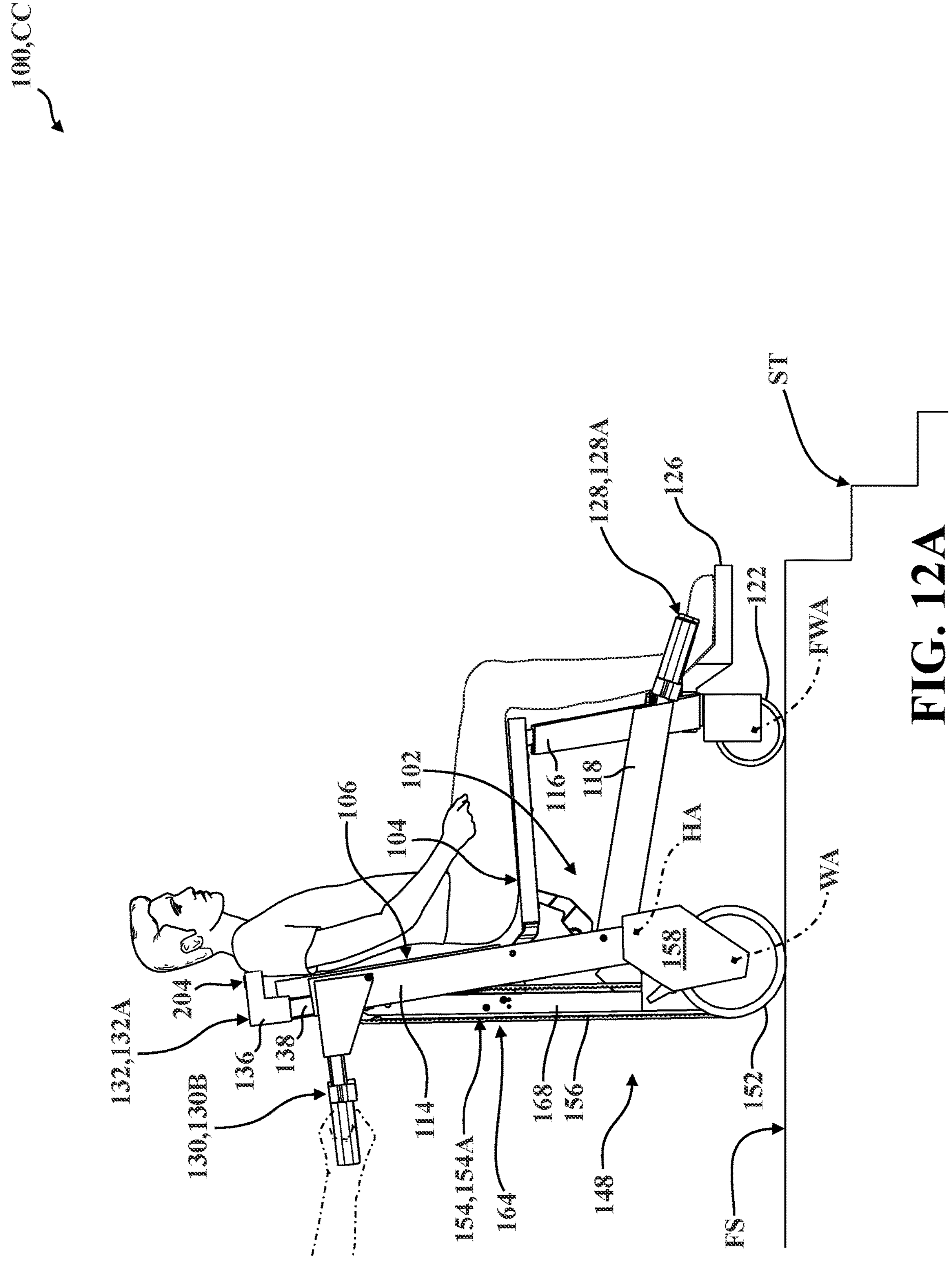
FIG. 12A is a right-side plan view of the patient transport apparatus of FIGS. 1-11D, shown supporting a patient in the chair configuration on a floor surface adjacent to stairs, and shown with a first caregiver engaging a pivoting handle assembly.
Figure 12B:
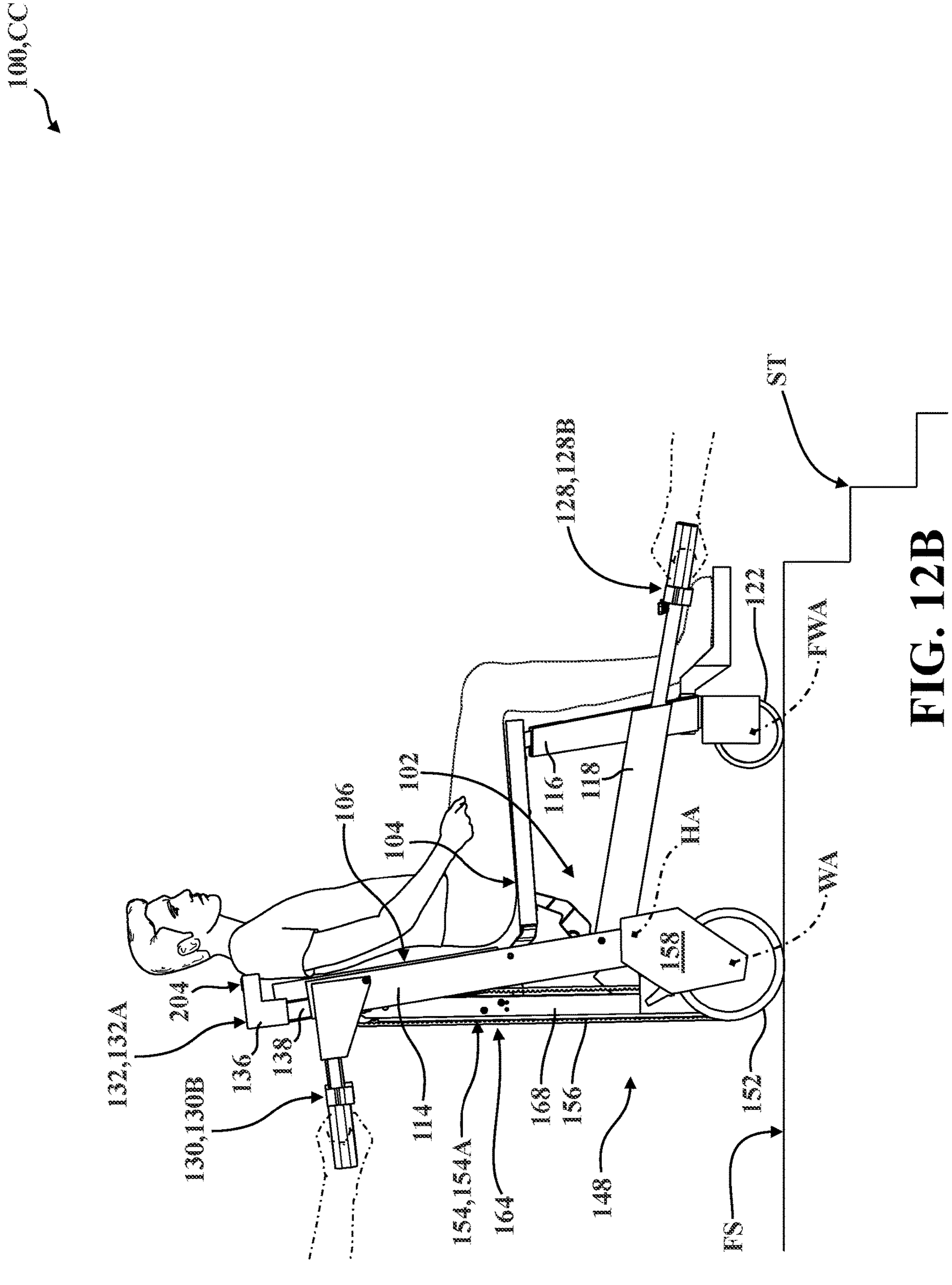
FIG. 12B is another right-side plan view of the patient transport apparatus of FIG. 12A, shown with a second caregiver engaging a front handle assembly in an extended position.
Figure 12C:
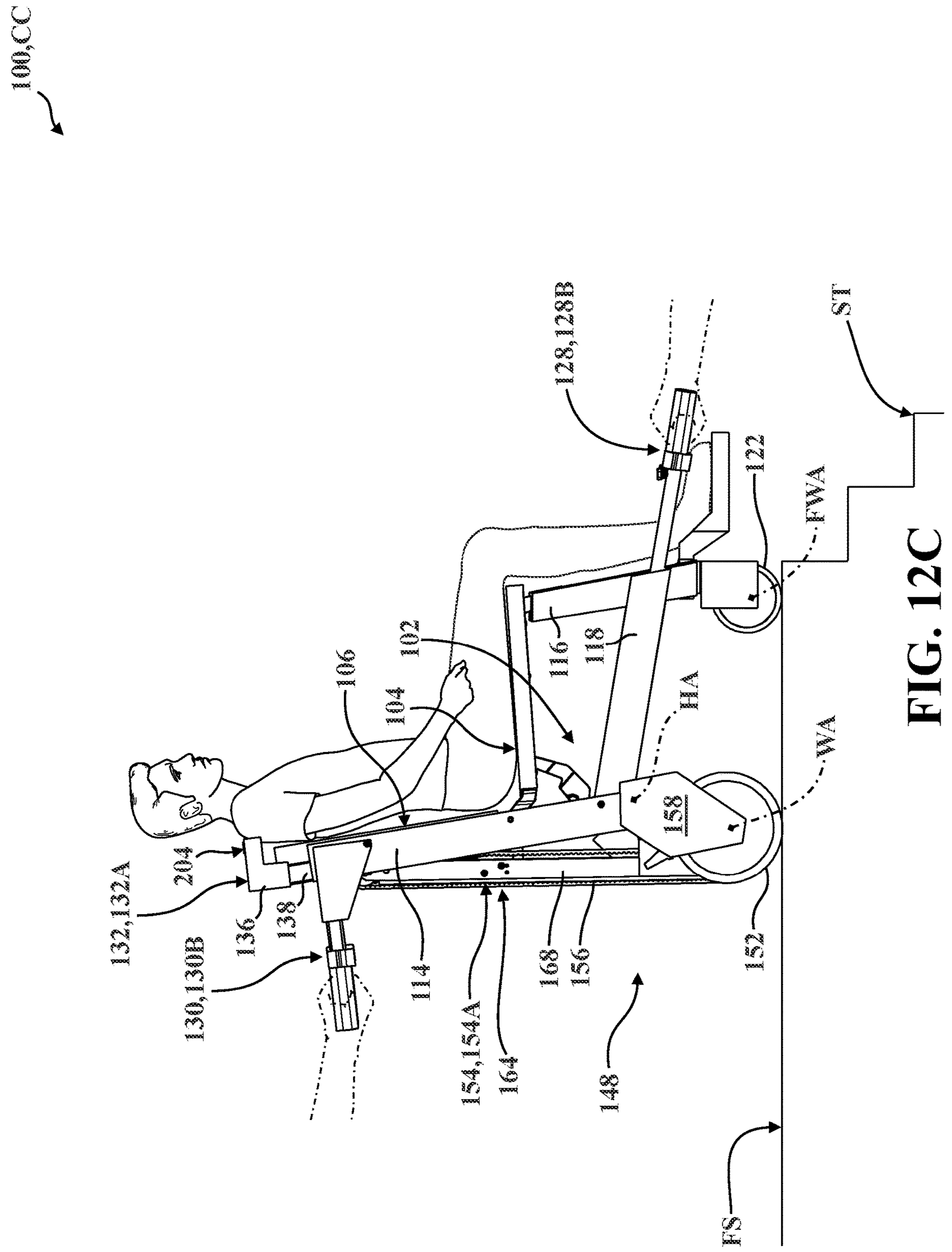
FIG. 12C is another right-side plan view of the patient transport apparatus of FIG. 12B, shown having moved closer to the stairs.
Figure 12D:
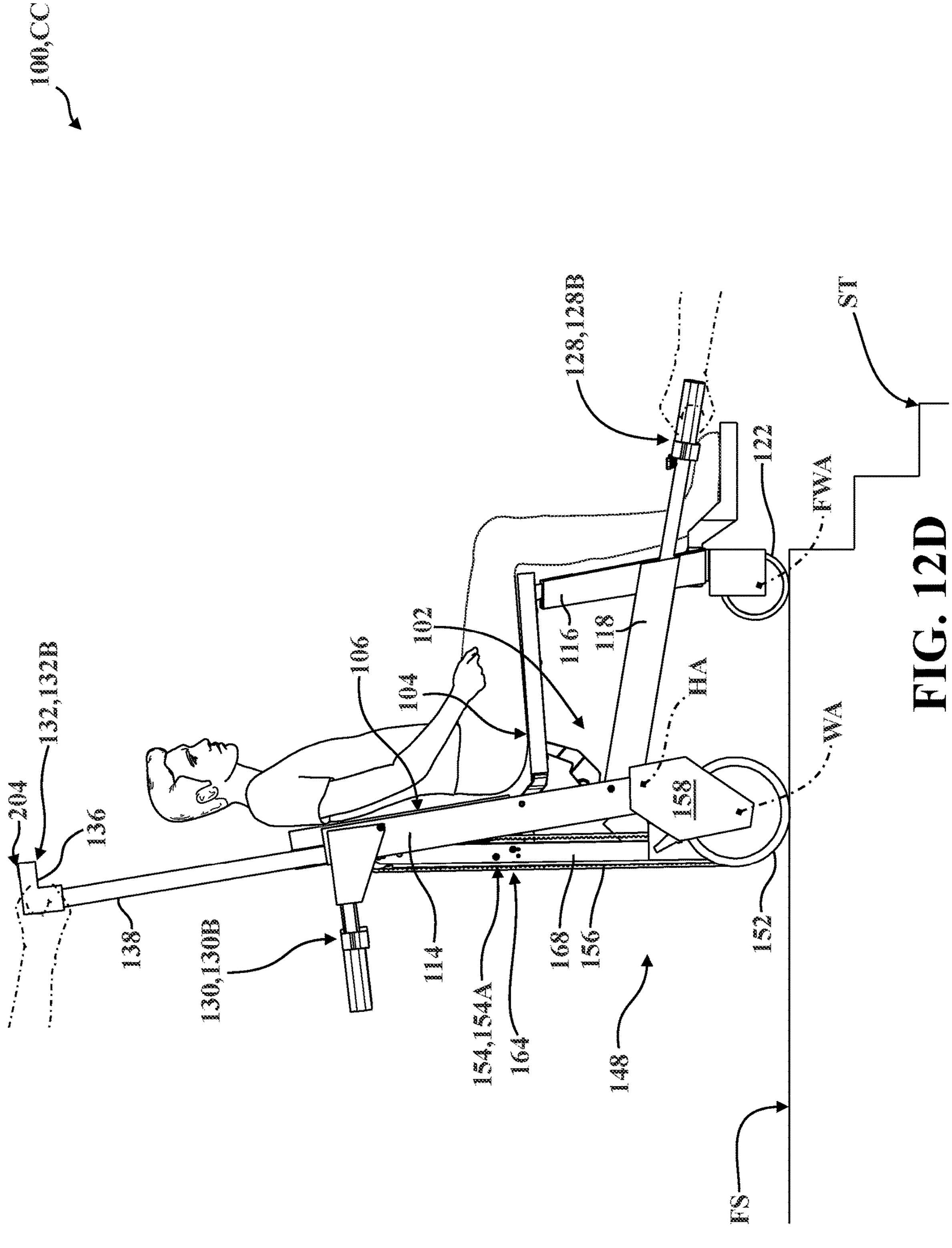
FIG. 12D is another right-side plan view of the patient transport apparatus of FIG. 12C, shown with the first caregiver engaging the handle assembly in the extended position.

The handle assembly 132 is also coupled to the rear support assembly 108, and generally comprises an upper grip 136 operatively attached to extension posts 138 which are supported within the respective rear uprights 114 for movement between a collapsed position 132A (see FIGS. 1 and 12C) and an extended position 132B (see FIGS. 2 and 12D). To this end, the extension posts 138 of the handle assembly 132 may be slidably supported by bushings, bearings, and the like (not shown) coupled to the rear uprights 114, and may be lockable in and/or between the collapsed position 132A and the extended position 132B via an extension lock mechanism 140 with an extension lock release 142 arranged for engagement by the caregiver. As is best shown in FIG. 3, the extension lock release 142 may be realized as a flexible connector which extends generally laterally between the rear uprights 114, and supports a cable connected to extension lock mechanisms 140 which releasably engage the extension posts 138 to maintain the handle assembly 132 in the extended position 132B and the collapsed position 132A (not shown in detail). Here, it will be appreciated that the extension lock mechanism 140 and/or the extension lock release 142 could be of a number of different styles, types, configurations, and the like sufficient to facilitate selectively locking the handle assembly 132 in the extended position 132B. In some embodiments, the handle assembly 132, the extension lock mechanism 140, and/or the extension lock release 142 could be configured similar to as is disclosed in U.S. Pat. No. 6,648,343, previously referenced. Other configurations are contemplated.

Figure 12E:
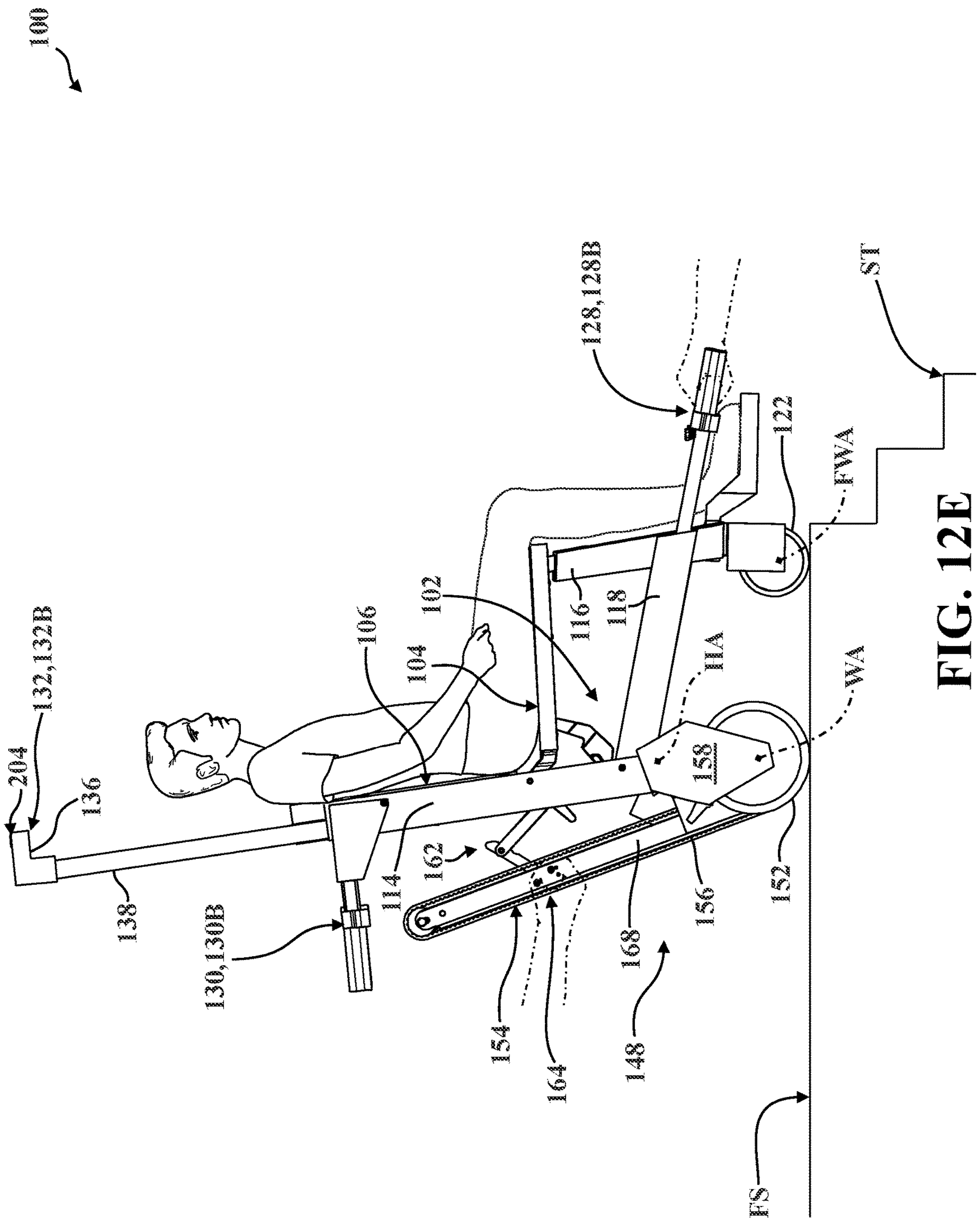
FIG. 12E is another right-side plan view of the patient transport apparatus of FIG. 12D, shown with the first caregiver having engaged the deployment lock mechanism to move the track assembly out of the retracted position.
Figure 12F:
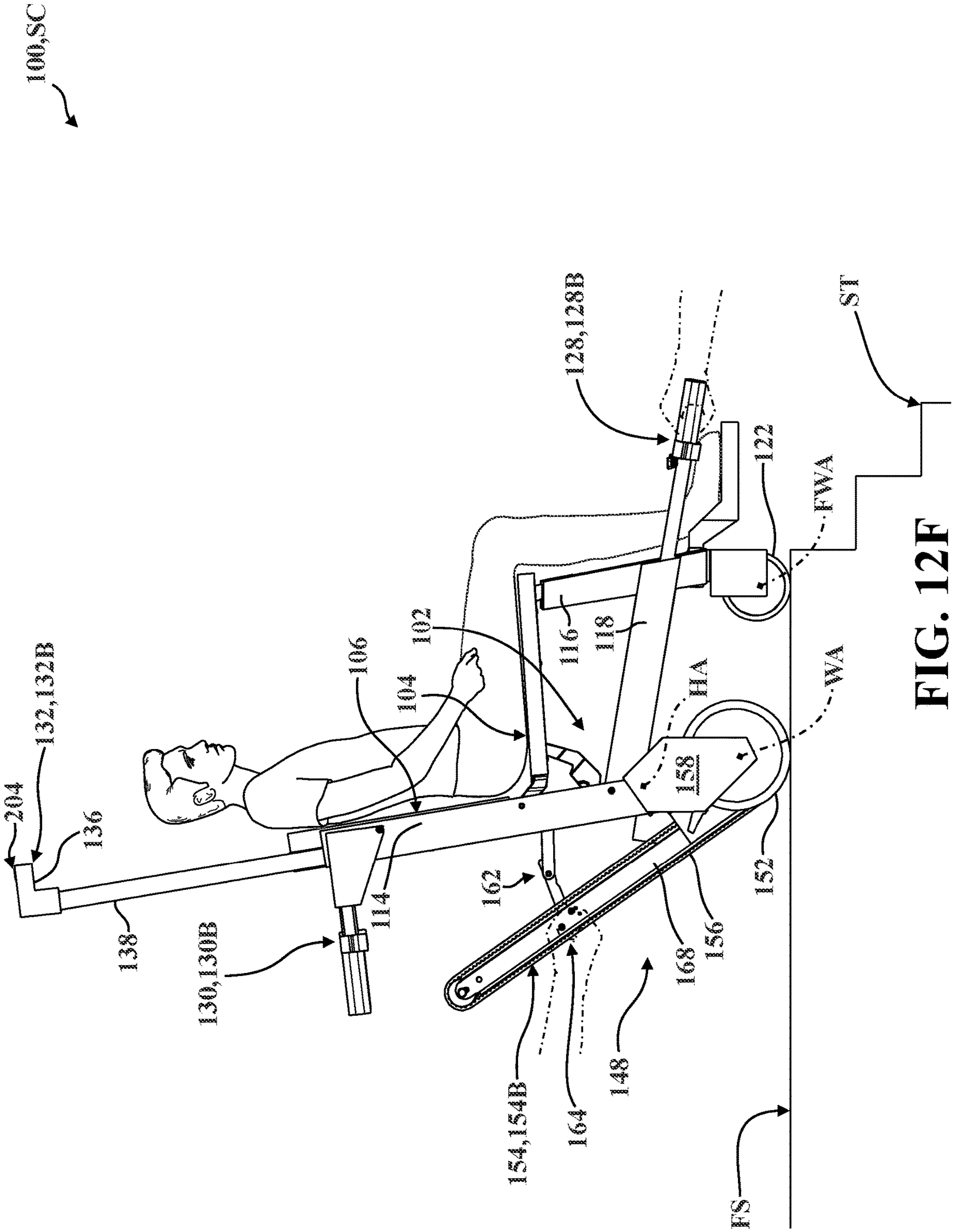
FIG. 12F is another right-side plan view of the patient transport apparatus of FIG. 12E, shown supporting the patient in the stair configuration with the track assembly in the deployed position.
Figure 12G:
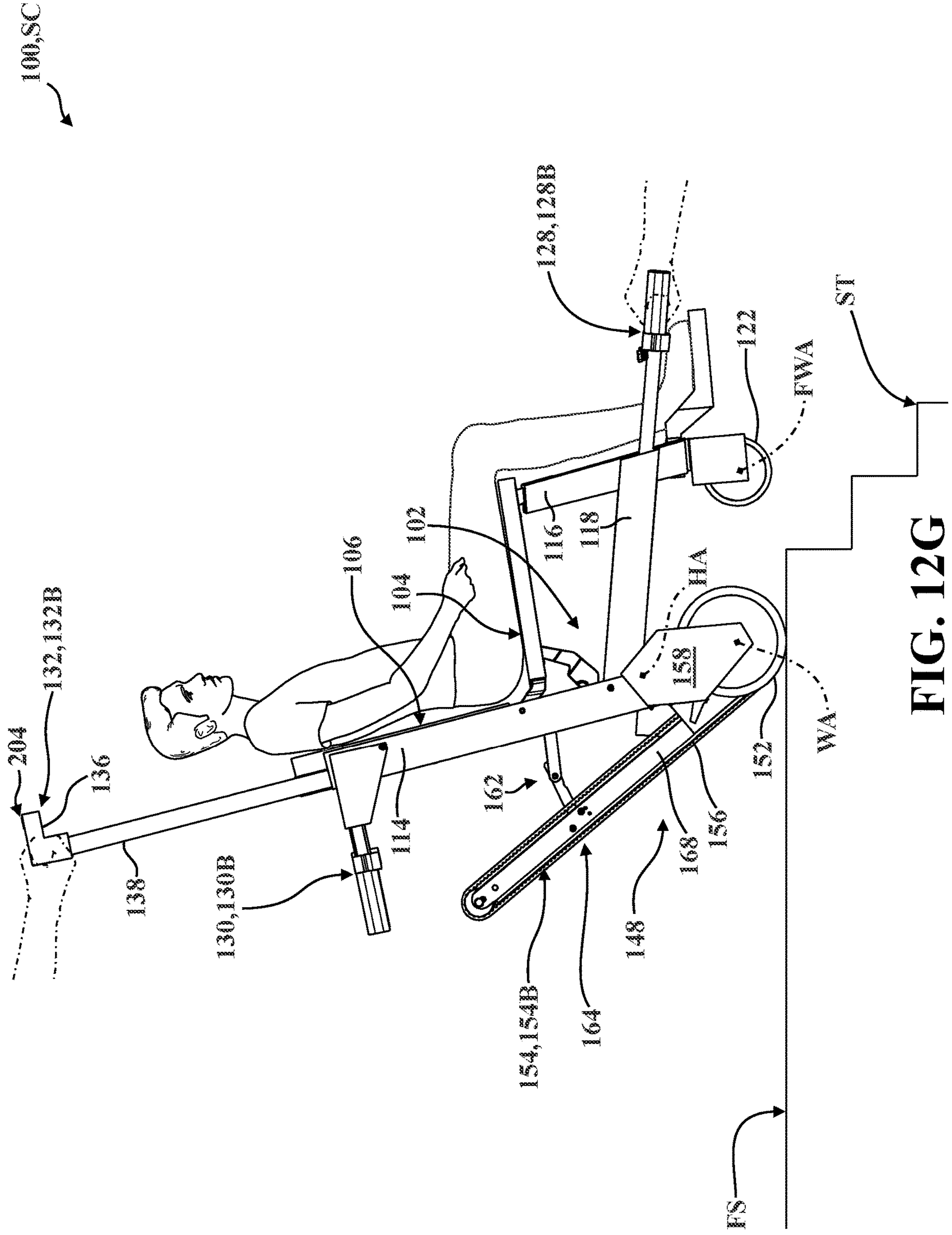
FIG. 12G is another right-side plan view of the patient transport apparatus of FIG. 12F, shown having moved towards the stairs for descent while supported by the first and second caregivers.
Figure 12H:
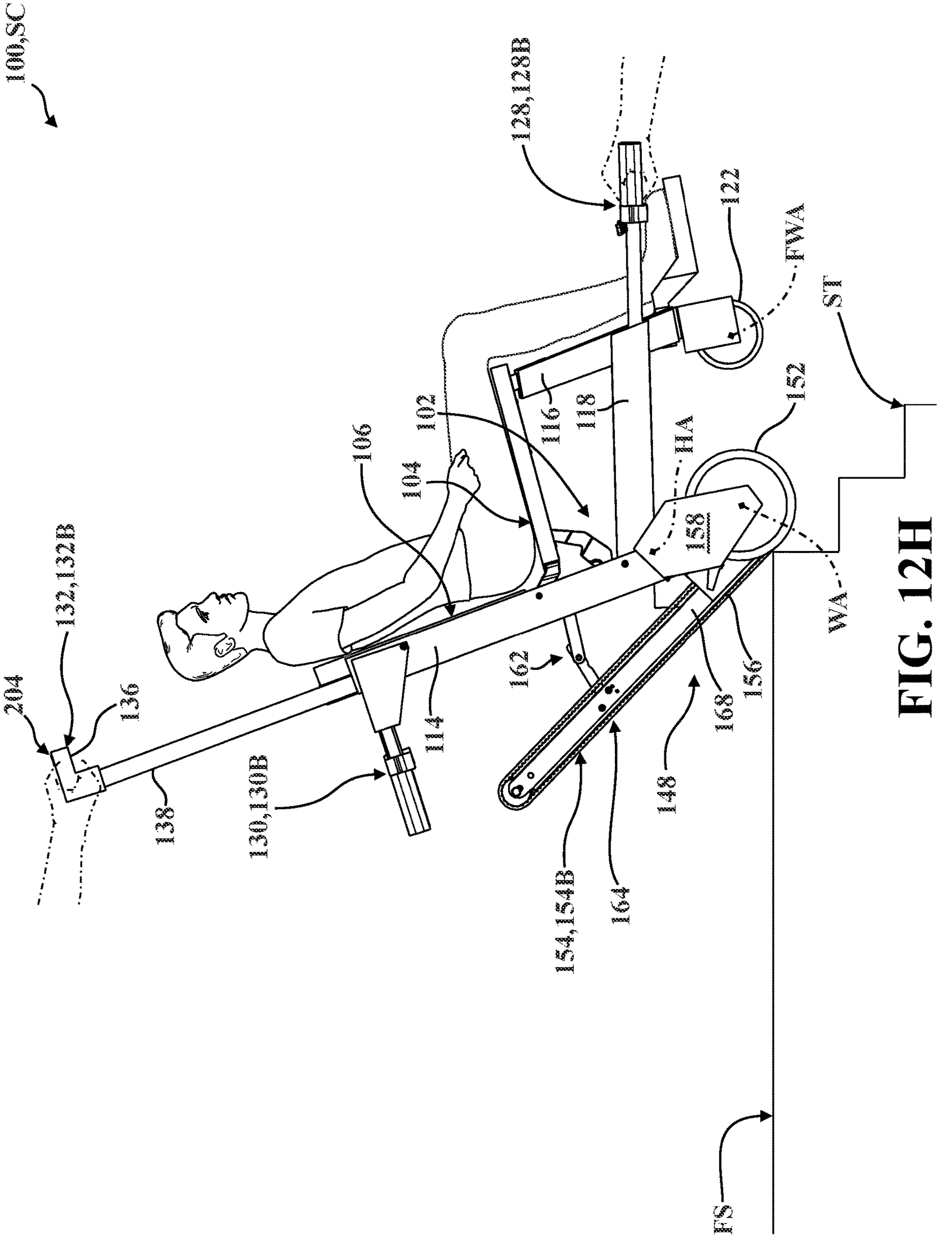
FIG. 12H is another right-side plan view of the patient transport apparatus of FIG. 12C, shown having moved initially down the stairs for descent to bring a belt of the track assembly into contact with the stairs while still supported by the first and second caregivers.
Figure 12I:
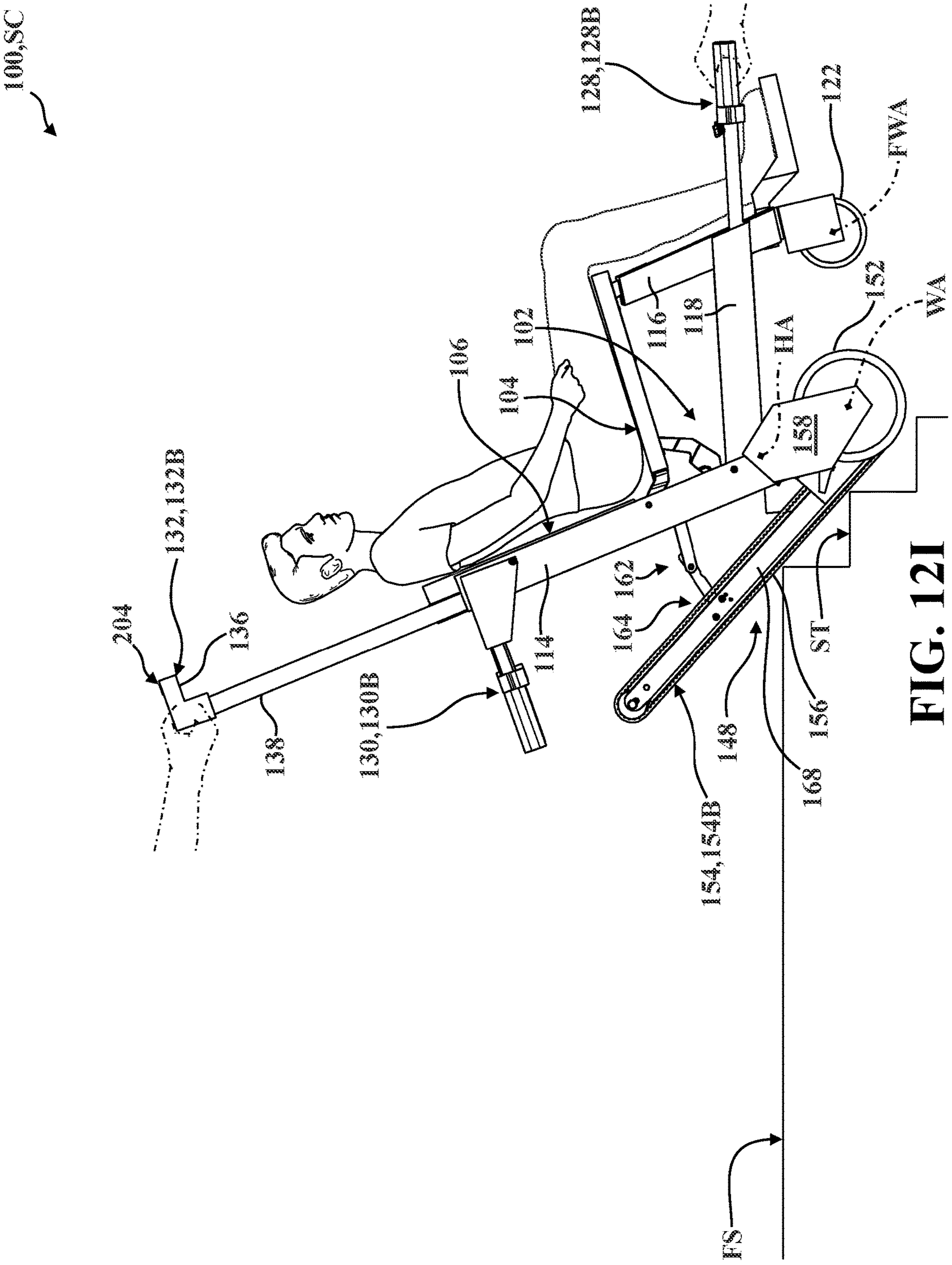
FIG. 12I is another right-side plan view of the patient transport apparatus of FIG. 12C, shown with the belt of the track assembly in contact with the stairs while still supported by the first and second caregivers.
Figure 13A:
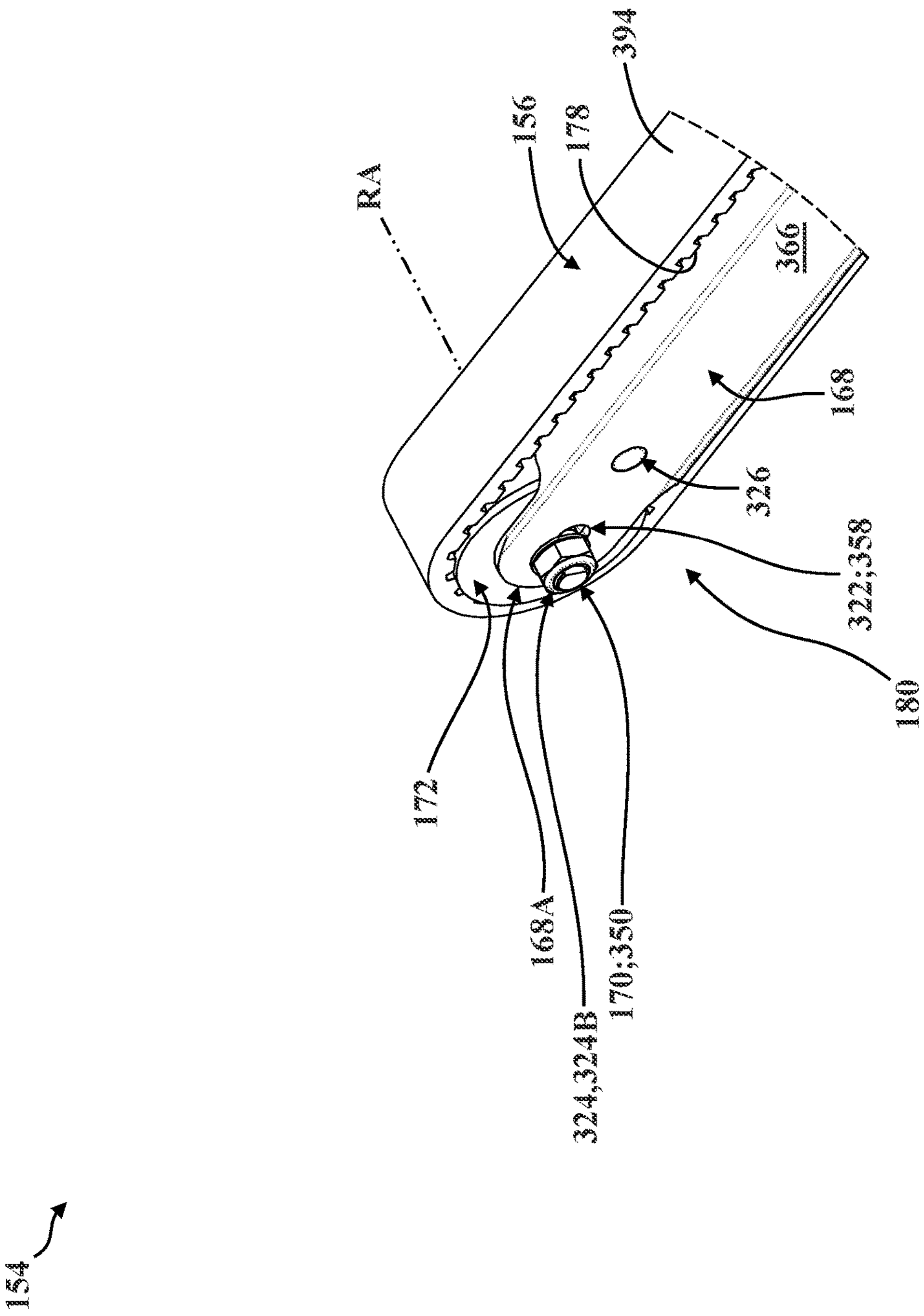
FIG. 13A is a partial perspective view of one of the track assemblies of the patient transport apparatus of FIGS. 1-12I, shown having a belt tensioner with a keeper disposed in an engaged configuration.
Figure 13B:
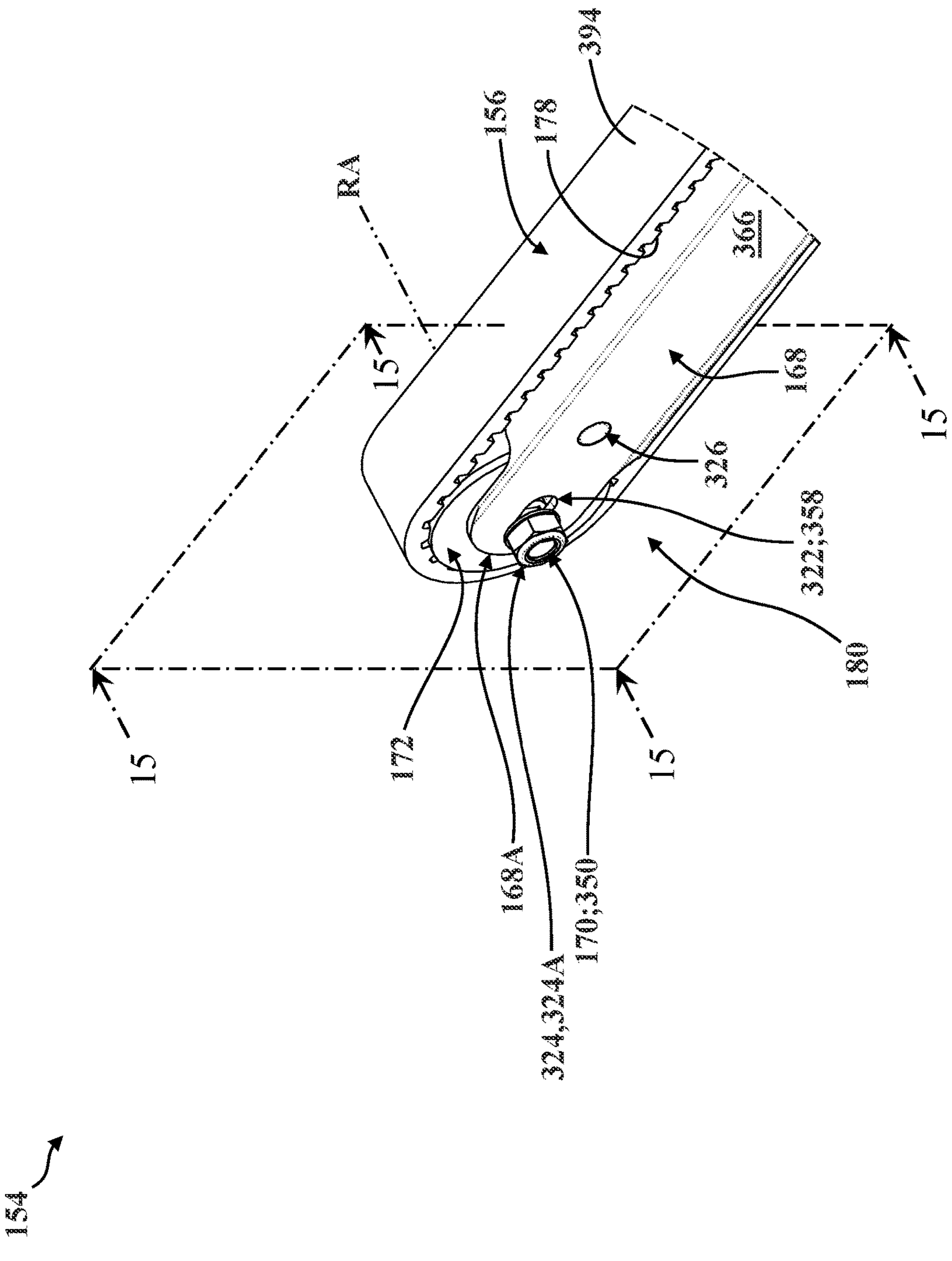
FIG. 13B is another partial perspective view of the track assembly of FIG. 13A, shown with the keeper of the belt tensioner disposed in a disengaged configuration.

In the representative embodiment illustrated herein, the upper grip 136 generally comprises a first hand grip region 144 arranged adjacent to one of the extension posts 138, and a second hand grip region 146 arranged adjacent to the other of the extension posts 138, each of which may be engaged by the caregiver to support the patient transport apparatus 100 for movement, such as during patient transport up or down stairs ST (see FIGS. 12G-12I).

As noted above, the patient transport apparatus 100 is configured for use int transporting the patient across floor surfaces FS, such as when operating in the stair configuration SC, and for transporting the patient along stairs ST when operating in the stair configuration SC. To these ends, the illustrated patient transport apparatus 100 includes a carrier assembly 148 arranged for movement relative to the support structure 102 between the chair configuration CC and the stair configuration ST. The carrier assembly 148 generally comprises at least one shaft 150 defining a wheel axis WA, one or more rear wheels 152 supported for rotation about the wheel axis WA, at least one track assembly 154 having a belt 156 for engaging stairs ST, and one or more hubs 158 supporting the shaft 150 and the track assembly 154 and the shaft 150 for concurrent pivoting movement about a hub axis HA. Here, movement of the carrier assembly 148 from the chair configuration CC (see FIGS. 1 and 6A) to the stair configuration SC (see FIGS. 2 and 6B) simultaneously deploys the track assembly 154 for engaging stairs ST with the belt 156 and moves the wheel axis WA longitudinally closer to the front support assembly 110 so as to position the rear wheels 152 further underneath the seat section 104 and closer to the front wheels 122.

As is described in greater detail below in connection with FIGS. 12A-12I, the movement of the rear wheels 152 relative to the front wheels 122 when transitioning from the chair configuration CC to the stair configuration SC that is afforded by the patient transport apparatus 100 of the present disclosure affords significant improvements in patient comfort and caregiver usability, in that the rear wheels 152 are arranged to promote stable transport across floor surfaces FS in the chair configuration CC but are arranged to promote easy transitioning from floor surfaces to stairs ST as the patient transport apparatus 100 is "tilted" backwards about the rear wheels 152 (compare FIGS. 12D-12H). Put differently, positioning the rear wheels 152 relative to the front wheels 122 consistent with the present disclosure makes "tilting" the patient transport apparatus 100 significantly less burdensome for the caregivers and, at the same time, much more comfortable for the patient due to the arrangement of the patient's center of gravity relative to the portion of the rear wheels 152 contacting the floor surface FS as the patient transport apparatus 100 is "tilted" backwards to transition into engagement with the stairs ST.

In the representative embodiments illustrated herein, the carrier assembly 148 comprises hubs 158 that are pivotably coupled to the respective rear uprights 114 for concurrent movement about the hub axis HA. Here, one or more bearings, bushings, shafts, fasteners, and the like (not shown in detail) may be provided to facilitate pivoting motion of the hubs 158 relative to the rear uprights 114. Similarly, bearings and/or bushings (not shown) may be provided to facilitate smooth rotation of the rear wheels 152 about the wheel axis WA. Here, the shafts 150 may be fixed to the hubs 158 such that the rear wheels 152 rotate about the shafts 150 (e.g., about bearings supported in the rear wheels 152), or the shafts 150 could be supported for rotation relative to the hubs 158. Each of the rear wheels 152 is also provided with a wheel lock 160 coupled to its respective hub 158 to facilitate inhibiting rotation about the wheel axis WA. The wheel locks 160 are generally pivotable relative to the hubs 158, and may be configured in a number of different ways without departing from the scope of the present disclosure. While the representative embodiment of the patient transport apparatus 100 illustrated herein employs hubs 158 with "mirrored" profiles that are coupled to the respective rear uprights 114 and support discrete shafts 150 and wheel locks 160, it will be appreciated that a single hub 158 and/or a single shaft 150 could be employed. Other configurations are contemplated.

Figure 6B:
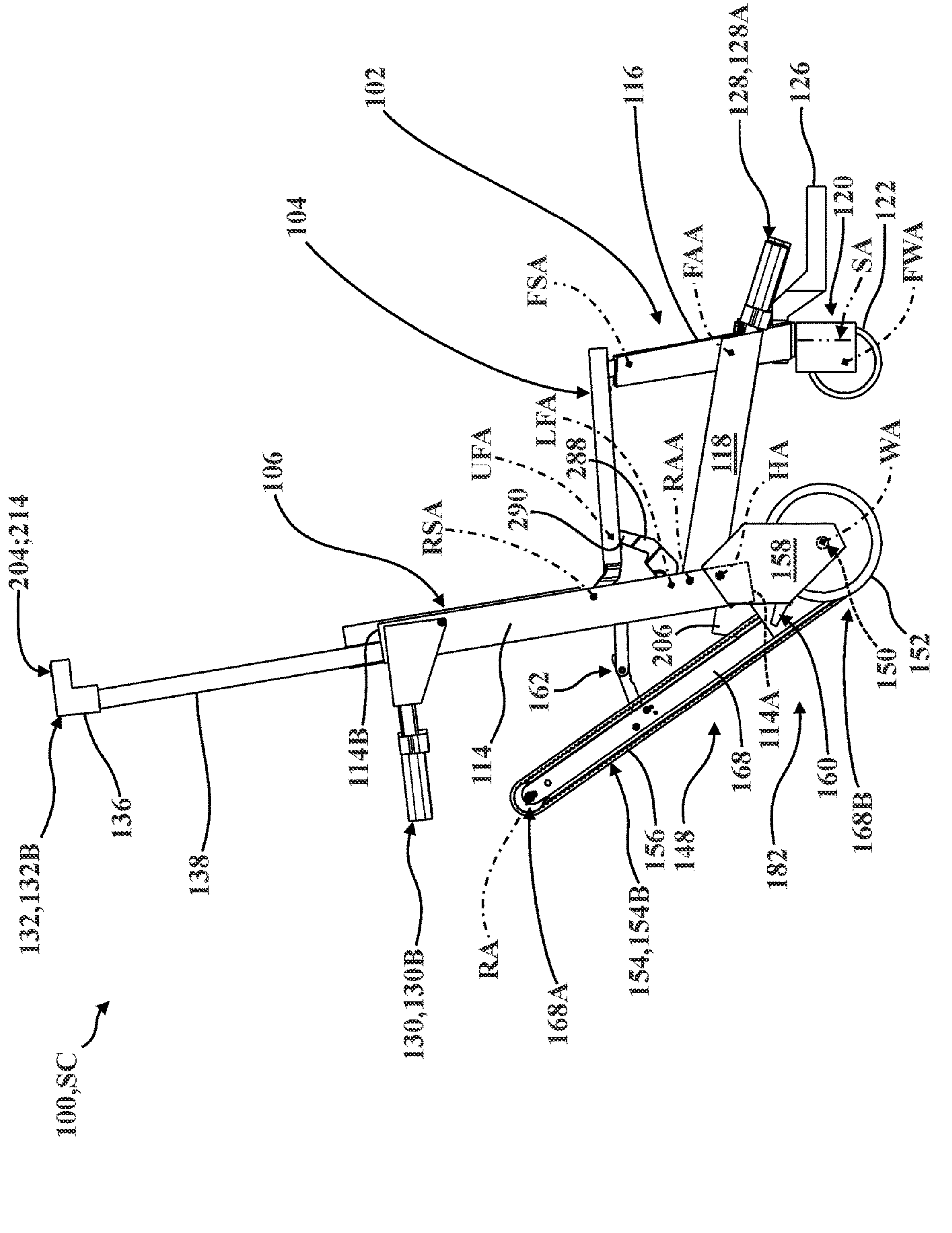
FIG. 6B is another right-side plan view of the patient transport apparatus of FIGS. 5-6A, shown arranged in the stair configuration as depicted in FIGS. 2-3.

As is best depicted in FIGS. 6A-6B, the rear uprights 114 each generally extend between a lower upright end 114A and an upper upright end 114B, with the hub axis HA arranged adjacent to the lower upright end 114A. The lower upright end 114A is supported for movement within the hub 158, which may comprise a hollow profile or recess defined by multiple hub housing components (not shown in detail in FIGS. 6A-6B). The rear uprights 114 may each comprise a generally hollow, extruded profile which supports various components of the patient transport apparatus 100. In the illustrated embodiment, the hub axis HA is arranged generally vertically between the rear arm axis RAA and the wheel axis WA.

Figure 7A:
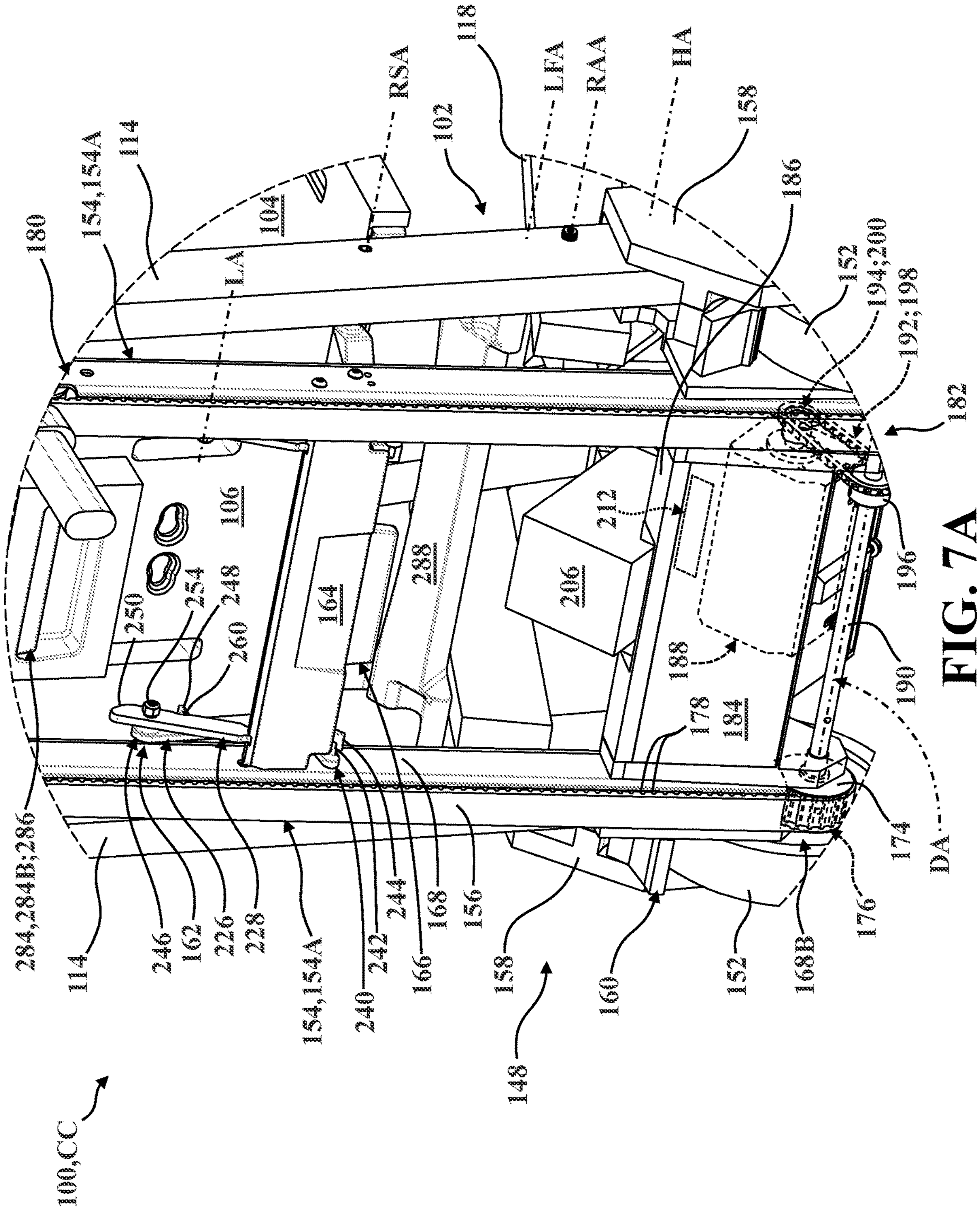
FIG. 7A is a partial rear perspective view of the patient transport apparatus of FIGS. 1-6B, shown arranged in the chair configuration as depicted in FIGS. 1 and 6A, with the deployment lock mechanism shown retaining the track assembly in the retracted position.
Figure 7B:
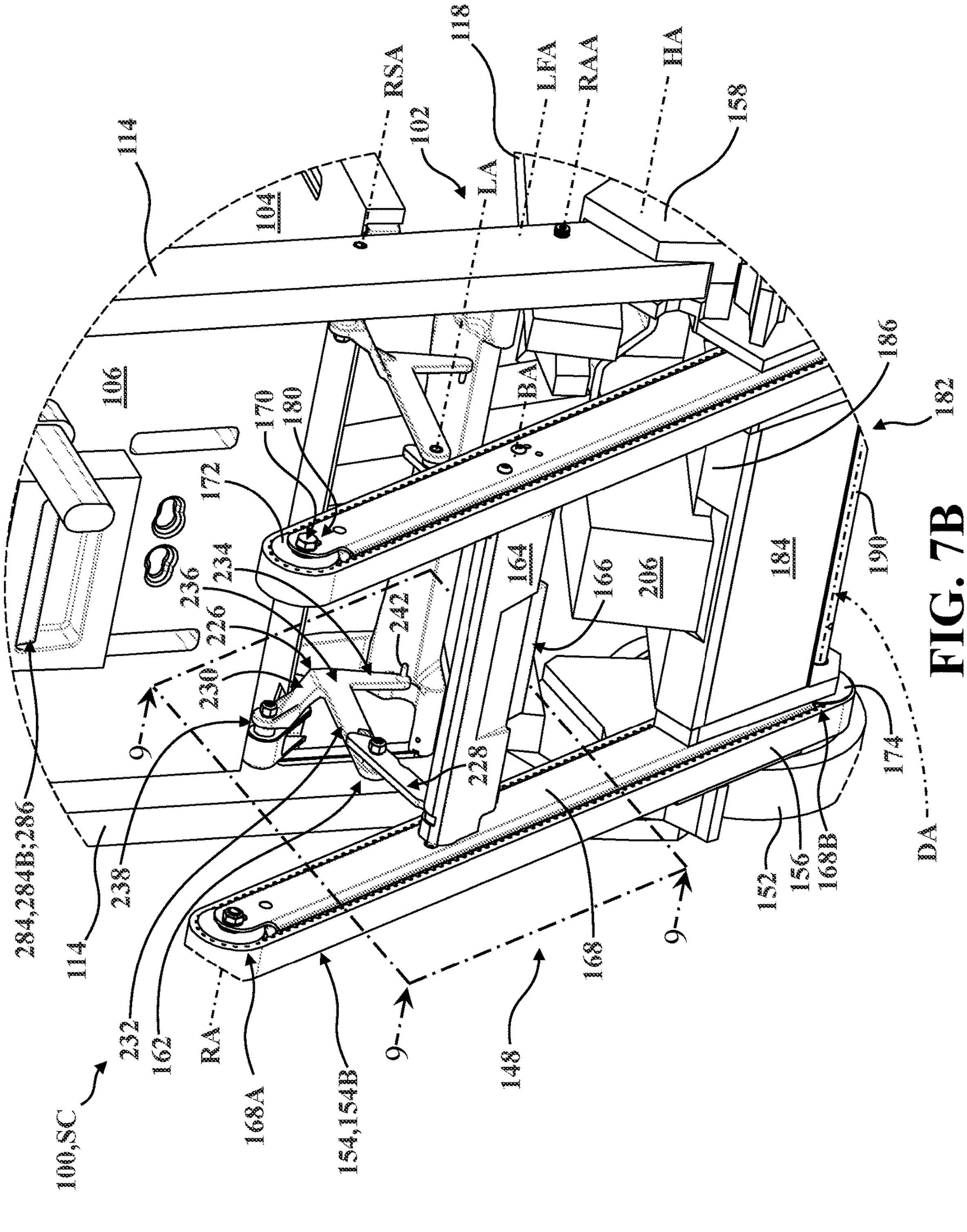
FIG. 7B is another partial rear perspective view of the patient transport apparatus of FIG. 7A, shown arranged in the stair configuration as depicted in FIGS. 2-3 and 6B, with the deployment lock mechanism shown retaining the track assembly in the deployed position.

Referring now to FIGS. 7A-7B, as noted above, the track assemblies 154 move concurrently with the hubs 158 between the chair configuration CC and the stair configuration SC. Here, the track assemblies 154 are arranged in a retracted position 154A when the carrier assembly 148 is disposed in the chair configuration CC, and are disposed in a deployed position 154B when the carrier assembly 148 is disposed in the stair configuration SC. As is described in greater detail below, the illustrated patient transport apparatus 100 comprises a deployment linkage 162 and a deployment lock mechanism 164 with a deployment lock release 166 arranged for engagement by the caregiver to facilitate changing between the retracted position 154A and the deployed position 154B (and, thus, between the chair configuration CC and the stair configuration SC).

In the illustrated embodiment, the patient transport apparatus 100 comprises laterally-spaced track assemblies 154 each having a single belt 156 arranged to contact stairs ST. However, it will be appreciated that other configurations are contemplated, and a single track assembly 154 and/or track assemblies with multiple belts 156 could be employed. The track assemblies 154 each generally comprise a rail 168 extending between a first rail end 168A and a second rail end 168B. The second rail end 168B is operatively attached to the hub 158, such as with one or more fasteners (not shown in detail). An axle 170 defining a roller axis RA is disposed adjacent to the first rail end 168A of each rail 168, and a roller 172 is supported for rotation about the roller axis RA (compare FIGS. 9A-9B). For each of the track assemblies 154, the belt 156 is disposed in engagement with the roller 172 and is arranged for movement relative to the rail 168 in response to rotation of the roller 172 about the roller axis RA. Adjacent to the second rail end 168B of each rail 168, a drive pulley 174 is supported for rotation about a drive axis DA and is likewise disposed in engagement with the belt 156 (see FIGS. 7A-7B; rotation about drive axis DA not shown in detail). Here, the drive pulley 174 comprises outer teeth 176 which are disposed in engagement with inner teeth 178 formed on the belt 156. The track assemblies 154 each also comprise a belt tensioner, generally indicated at 180, configured to adjust tension in the belt 156 between the roller 172 and the drive pulley 174.

In the representative embodiment illustrated herein, the patient transport apparatus 100 comprises a drive system, generally indicated at 182, configured to facilitate driving the belts 156 of the track assemblies 154 relative to the rails 168 to facilitate movement of the patient transport apparatus 100 up and down stairs ST. To this end, and as is depicted in FIG. 7A, the drive system 182 comprises a drive frame 184 and a cover 186 which are operatively attached to the hubs 158 of the carrier assembly 148 for concurrent movement with the track assemblies 154 between the retracted position 154A and the deployed position 154B. A motor 188 (depicted in phantom in FIG. 7A) is coupled to the drive frame 184 and is concealed by the cover 186. The motor 188 is configured to selectively generate rotational torque used to drive the belts 156 via the drive pulleys 174, as described in greater detail below. To this end, a drive axle 190 is coupled to each of the drive pulleys 174 and extends along the drive axis DA laterally between the track assemblies 154. The drive axle 190 is rotatably supported by the drive frame 184, such as by one or more bearings, bushings, and the like (not shown in detail). A geartrain 192 is disposed in rotational communication between the motor 188 and the drive axle 190. To this end, in the embodiment depicted in FIG. 7A, the geartrain 192 comprises a first sprocket 194, a second sprocket 196, and an endless chain 198. Here, the motor 188 comprises an output shaft 200 to which the first sprocket 194 is coupled, and the second sprocket 196 is coupled to the drive axle 190. The endless chain 198, in turn, is supported about the first sprocket 194 and the second sprocket 196 such that the drive axle 190 and the output shaft 200 rotate concurrently. The geartrain 192 may be configured so as to adjust the rotational speed and/or torque of the drive axle 190 relative to the output shaft 200 of the motor, such as by employing differently-configured first and second sprockets 194, 196 (e.g., different diameters, different numbers of teeth, and the like).

While the representative embodiment of the drive system 182 illustrated herein utilizes a single motor 188 to drive the belts 156 of the track assemblies 154 concurrently using a chain-based geartrain 192, it will be appreciated that other configurations are contemplated. By way of non-limiting example, multiple motors 188 could be employed, such as to facilitate driving the belts 156 of the track assemblies 154 independently. Furthermore, different types of geartrains 192 are contemplated by the present disclosure, including without limitation geartrains 192 which comprise various arrangements of gears, planetary gearsets, and the like.

Figure 4:
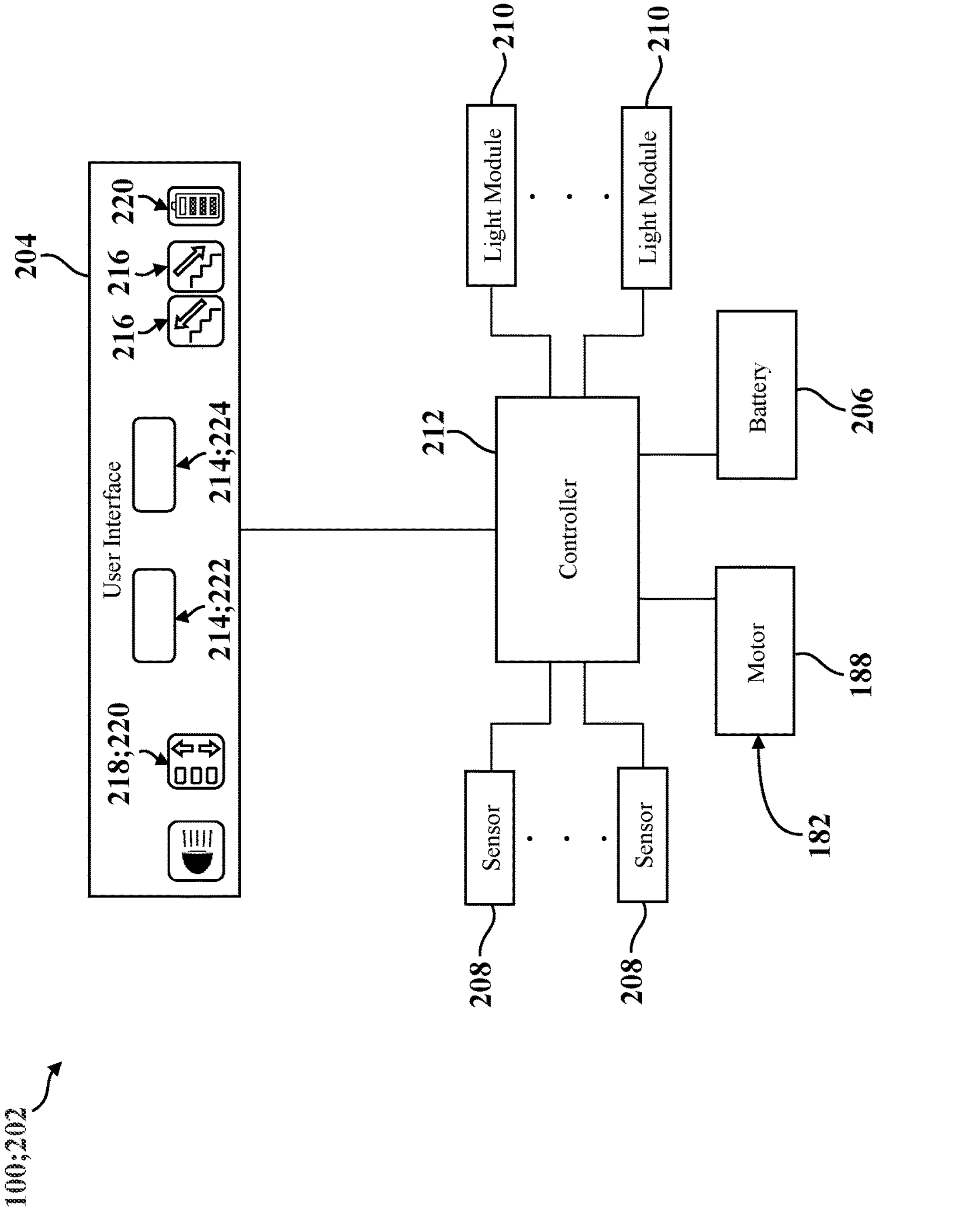
FIG. 4 is a partial schematic view of a control system of the patient transport apparatus of FIGS. 1-3, shown with a controller disposed in communication with a battery, a user interface, a drive system, and a plurality of light modules.

The patient transport apparatus 100 comprises a control system 202 to, among other things, facilitate control of the track assemblies 154. To this end, and as is depicted schematically in FIG. 4, the representative embodiment of the control system 202 generally comprises a user interface 204, a battery 206, one or more sensors 208, and one or more light modules 210 which are disposed in electrical communication with a controller 212. As will be appreciated from the subsequent description below, the controller 212 may be of a number of different types, styles, and/or configurations, and may employ one or more microprocessors for processing instructions or an algorithm stored in memory to control operation of the motor 188, the light modules 210, and the like. Additionally or alternatively, the controller 212 may comprise one or more sub-controllers, microcontrollers, field programmable gate arrays, systems on a chip, discrete circuitry, and/or other suitable hardware, software, and/or firmware that is capable of carrying out the functions described herein. The controller 212 is coupled to various electrical components of the patient transport apparatus 100 (e.g., the motor 188) in a manner that allows the controller 212 to control or otherwise interact with those electrical components the (e.g., via wired and/or wireless electrical communication). In some embodiments, the controller 212 may generate and transmit control signals to the one or more powered devices, or components thereof, to drive or otherwise facilitate operating those powered devices, or to cause the one or more powered devices to perform one or more of their respective functions.

The controller 212 may utilize various types of sensors 208 of the control system 202, including without limitation force sensors (e.g., load cells), timers, switches, optical sensors, electromagnetic sensors, motion sensors, accelerometers, potentiometers, infrared sensors, ultrasonic sensors, mechanical limit switches, membrane switches, encoders, and/or cameras. One or more sensors 208 may be used to detect mechanical, electrical, and/or electromagnetic coupling between components of the patient transport apparatus 100. Other types of sensors 208 are also contemplated. Some of the sensors 208 may monitor thresholds movement relative to discrete reference points. The sensors 208 can be located anywhere on the patient transport apparatus 100, or remote from the patient transport apparatus 100. Other configurations are contemplated.

It will be appreciated that the patient transport apparatus 100 may employ light modules 210 to, among other things, illuminate the user interface 204, direct light toward the floor surface FS, and the like. It will be appreciated that the light modules 210 can be of a number of different types, styles, configurations, and the like (e.g., light emitting diodes LEDs) without departing from the scope of the present disclosure. Similarly, it will be appreciated that the user interface 204 may employ user input controls of a number of different types, styles, configurations, and the like (e.g., capacitive touch sensors, switches, buttons, and the like) without departing from the scope of the present disclosure.

The battery 206 provides power to the controller 212, the motor 188, the light modules 210, and other components of the patient transport apparatus 100 during use, and is removably attachable to the cover 186 of the drive system 182 in the illustrated embodiment (see FIG. 7A; attachment not shown in detail). The user interface 204 is generally configured to facilitate controlling the drive direction and drive speed of the motor 188 to move the belts 156 of the track assembly 154 and, thus, allow the patient transport apparatus 100 to ascend or descend stairs ST. Here, the user interface 204 may comprise one or more activation input controls 214 to facilitate driving the motor 188 in response to engagement by the caregiver, one or more direction input controls 216 to facilitate changing the drive direction of the motor 188 in response to engagement by the caregiver, and/or one or more speed input controls 218 to facilitate operating the motor 188 at different predetermined speeds selectable by the caregiver. The user interface 204 may also comprise various types of indicators 220 to display information to the caregiver. It will be appreciated that the various components of the control system 202 introduced above could be configured and/or arranged in a number of different ways, and could communicate with each other via one or more types of electrical communication facilitated by wired and/or wireless connections. Other configurations are contemplated.

The activation input controls 214 may be arranged in various locations about the patient transport apparatus. In the illustrated embodiments, a first activation input control 222 is disposed adjacent to the first hand grip region 144 of the handle assembly 132, and a second activation input control 224 is disposed adjacent to the second hand grip region 146. In the illustrated embodiment, the user interface 204 is configured such that the caregiver can engage either of the activation input controls 222, 224 with a single hand grasping the upper grip 136 of the handle assembly 132 during use.

In the illustrated embodiments, the patient transport apparatus 100 is configured to limit movement of the belts 156 relative to the rails 168 during transport along stairs ST in an absence of engagement with the activation input controls 214 by the caregiver. Put differently, one or more of the controller 212, the motor 188, the geartrain 192, and/or the track assemblies 154 may be configured to "brake" or otherwise prevent movement of the belts 156 unless the activation input controls 214 are engaged. To this end, the motor 188 may be controlled via the controller 212 to prevent rotation (e.g., driving with a 0% pulse-width modulation PWM signal) in some embodiments. However, other configurations are contemplated, and the patient transport apparatus 100 could be configured to prevent movement of the belts 156 in other ways. By way of non-limiting example, a mechanical brake system (not shown) could be employed in some embodiments.

Referring now to FIGS. 7A-9B, the patient transport apparatus 100 employs the deployment lock mechanism 164 to releasably secure the track assembly 154 in the retracted position 154A and in the deployed position 154B. As is described in greater detail below, the deployment lock release 166 is arranged for engagement by the caregiver to move between the retracted position 154A and the deployed position 154B. The deployment lock mechanism 164 is coupled to the track assemblies 154 for concurrent movement, and the deployment linkage 162 is coupled between the deployment lock mechanism 164 and the support structure 102. The illustrated deployment linkage 162 generally comprises connecting links 226 which are pivotably coupled to the support structure 102, and brace links 228 which are coupled to the deployment lock mechanism 164 and are respectively pivotably coupled to the connecting links 226.

Figure 9A:
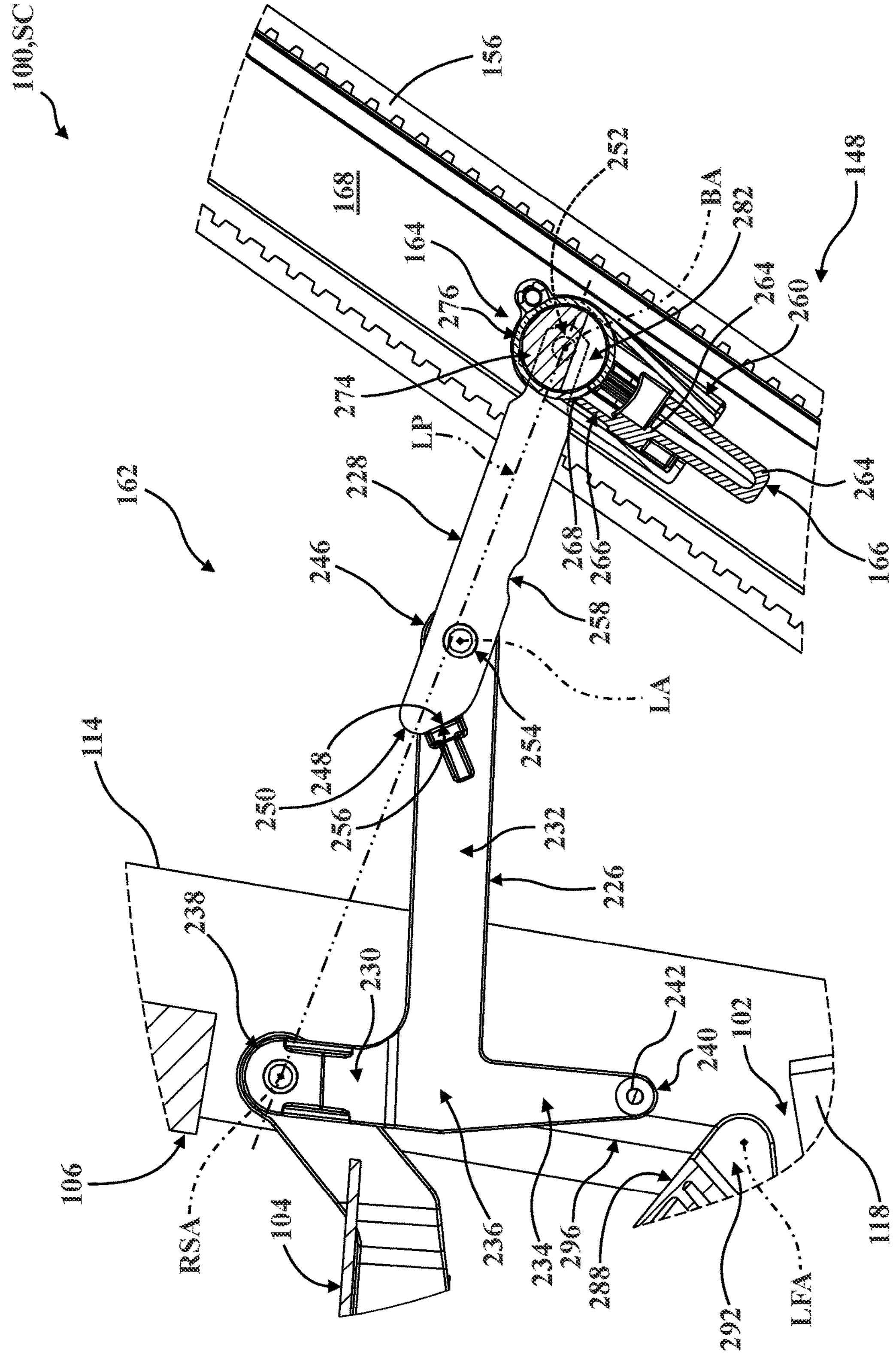
FIG. 9A is a partial section view generally taken through plane 9 of FIGS. 7B-8, shown with the deployment lock mechanism retaining the track assembly in the deployed position.

As is best shown in FIG. 9A, the connecting links 226 each comprise or otherwise define a forward pivot region 230, a connecting pivot region 232, a trunnion region 234, and an interface region 236. The forward pivot regions 230 extend from the interface regions 236 to forward pivot mounts 238 which are pivotably coupled to the rear uprights 114 about the rear seat axis RSA, such as by one or more fasteners, bushings, bearings, and the like (not shown in detail). Here, because the rear uprights 114 are spaced laterally away from each other at a distance large enough to allow the track assemblies 154 to "nest" therebetween in the retracted position 154A (see FIG. 7A), the forward pivot regions 230 of the connecting links 226 extend at an angle away from the rear uprights 114 at least partially laterally towards the track assemblies 154. The trunnion regions 234 extend generally vertically downwardly from the interface regions 236 to trunnion mount ends 240, and comprise trunnions 242 which extend generally laterally and are arranged to abut trunnion catches 244 of the deployment lock mechanism 164 to retain the track assemblies 154 in the retracted position 154A (see FIG. 7A) as described in greater detail below. The connecting pivot regions 232 extend longitudinally away from the interface regions 236 to rearward pivot mounts 246 which pivotably couple to the brace links 228 about a link axis LA. The connecting pivot regions 232 also comprise link stops 248 that are shaped and arranged to abut the brace links 228 in the deployed position 154B (see FIG. 7B), as described in greater detail below. The connecting links 226 are each formed as separate components with mirrored profiles in the illustrated embodiments, but could be realized in other ways, with any suitable number of components.

The brace links 228 each generally extend between an abutment link end 250 and a rearward link mount 252, with a forward link mount 254 arranged therebetween. The forward link mounts 254 are pivotably coupled to the rearward pivot mounts 246 of the connecting links 226 about the link axis LA, such as by one or more fasteners, bushings, bearings, and the like (not shown in detail). The rearward link mounts 252 are each operatively attached to the deployment lock mechanism 164 about a barrel axis BA, as described in greater detail below. The brace links 228 each define a link abutment surface 256 disposed adjacent to the abutment link end 250 which are arranged to abut the link stops 248 of the connecting links 226 in the deployed position 154B (see FIGS. 7B and 9B). The brace links 228 also define a relief region 258 formed between the forward link mount 254 and the rearward link mount 252. The relief regions 258 are shaped to at least partially accommodate the link stops 248 of the connecting links 226 when the track assemblies 154 are in the retracted position 154A (not shown in detail).

Figure 8:
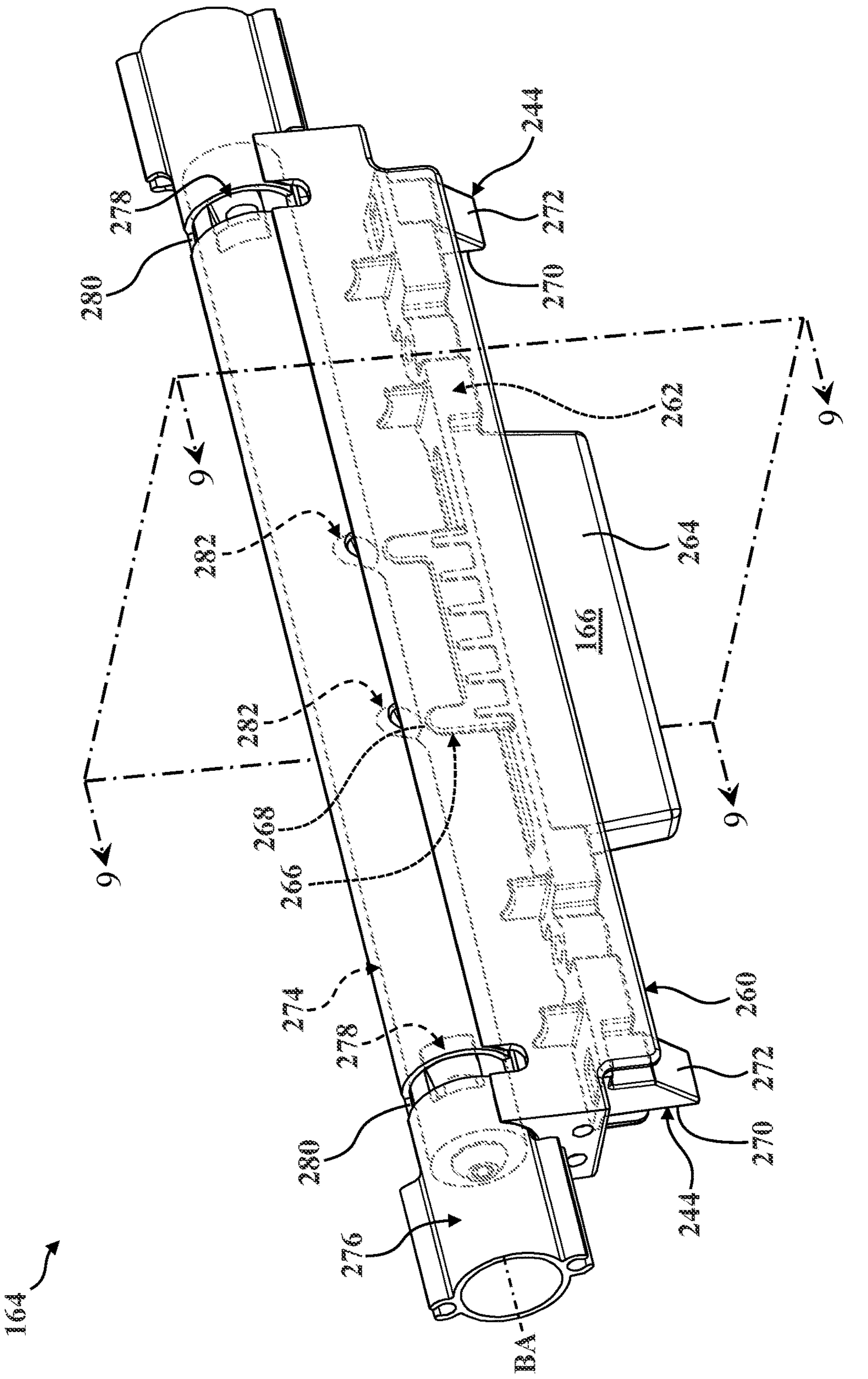
FIG. 8 is a perspective view of portions of the deployment lock mechanism of FIGS. 7A-7B, shown having a deployment lock release.

Referring now to FIG. 8, the deployment lock release 166 of the deployment lock mechanism 164 is supported for movement within a lock housing 260 which, in turn, is coupled to and extends laterally between the rails 168 of the track assemblies 154 (e.g., secured via fasteners; not shown). The deployment lock release 166 is formed as a unitary component in the illustrated embodiment, and generally comprises a deployment body 262, a deployment button 264, one or more push tabs 266, and the trunnion catches 244. The deployment button 264 is arranged for engagement by the caregiver, extends vertically downwardly from the deployment body 262, and is disposed laterally between the trunnion catches 244. The one or more push tabs 266 extend vertically upwardly from the deployment body 262 to respective push tab ends 268, and are employed to facilitate releasing the track assemblies 154 from the deployed position 154B as described in greater detail below. The trunnion catches 244 each define a retention face 270 arranged to abut the trunnions 242 of the connecting links 226 when the track assemblies 154 are in the retracted position 154A (see FIG. 7A; not shown in detail). The trunnion catches 244 also each define a trunnion cam face 272 arranged to engage against the trunnions 242 of the connecting links 226 as the track assemblies 154 are brought toward the deployed position 154B from the retracted position 154A. While not shown in detail throughout the drawings, engagement of the trunnions 242 against the trunnion cam faces 272 urges the deployment body 262 vertically upwardly within the lock housing 260 until the trunnions 242 come out of engagement with the trunnion cam faces 272. Here, one or more biasing elements (not shown) may bias the deployment lock release 166 vertically downwardly within the lock housing 260 such that disengagement of the trunnions 242 with trunnion cam faces 272 occurs as the track assemblies 154 reach the deployed position 154B and the trunnions 242 come into engagement with the retention faces 270 (see FIG. 7A; not shown in detail).

With continued reference to FIG. 8, the deployment lock mechanism 164 also comprises a barrel 274 supported for rotation about the barrel axis BA (compare FIGS. 9A-9B) within a cylinder housing 276 which, in turn, is coupled to and extends laterally between the rails 168 of the track assemblies 154 (e.g., secured via fasteners; not shown). The barrel 274 defines barrel notches 278 which receive the rearward link mounts 252 of the brace links 228 therein. Here, the cylinder housing 276 comprises transverse apertures 280 aligned laterally with the barrel notches 278 and shaped to receive the brace links 228 therethrough to permit the brace links 228 to move generally concurrently with the barrel 274 relative to the cylinder housing 276. Here, the barrel notches 278 and the rearward link mounts 252 are provided with complimentary profiles that allow the brace links 228 to pivot about the barrel axis BA as the barrel 274 rotates within the cylinder housing 276. The barrel notches 278 may be sized slightly larger than the rearward link mounts 252 to prevent binding. However, it will be appreciated that other configurations are contemplated. The barrel 274 also comprises push notches 282 arranged laterally between the barrel notches 278. The push notches 282 are shaped to receive the push tab ends 268 of the push tabs 266 to facilitate releasing the track assemblies 154 from the deployed position 154B in response to the caregiver engaging the deployment button 264. As depicted in FIG. 9A, retention of the track assemblies 154 in the deployed position 154B is achieved based on the geometry of the deployment linkage 162 acting as an "over center" lock.

Figure 9B:
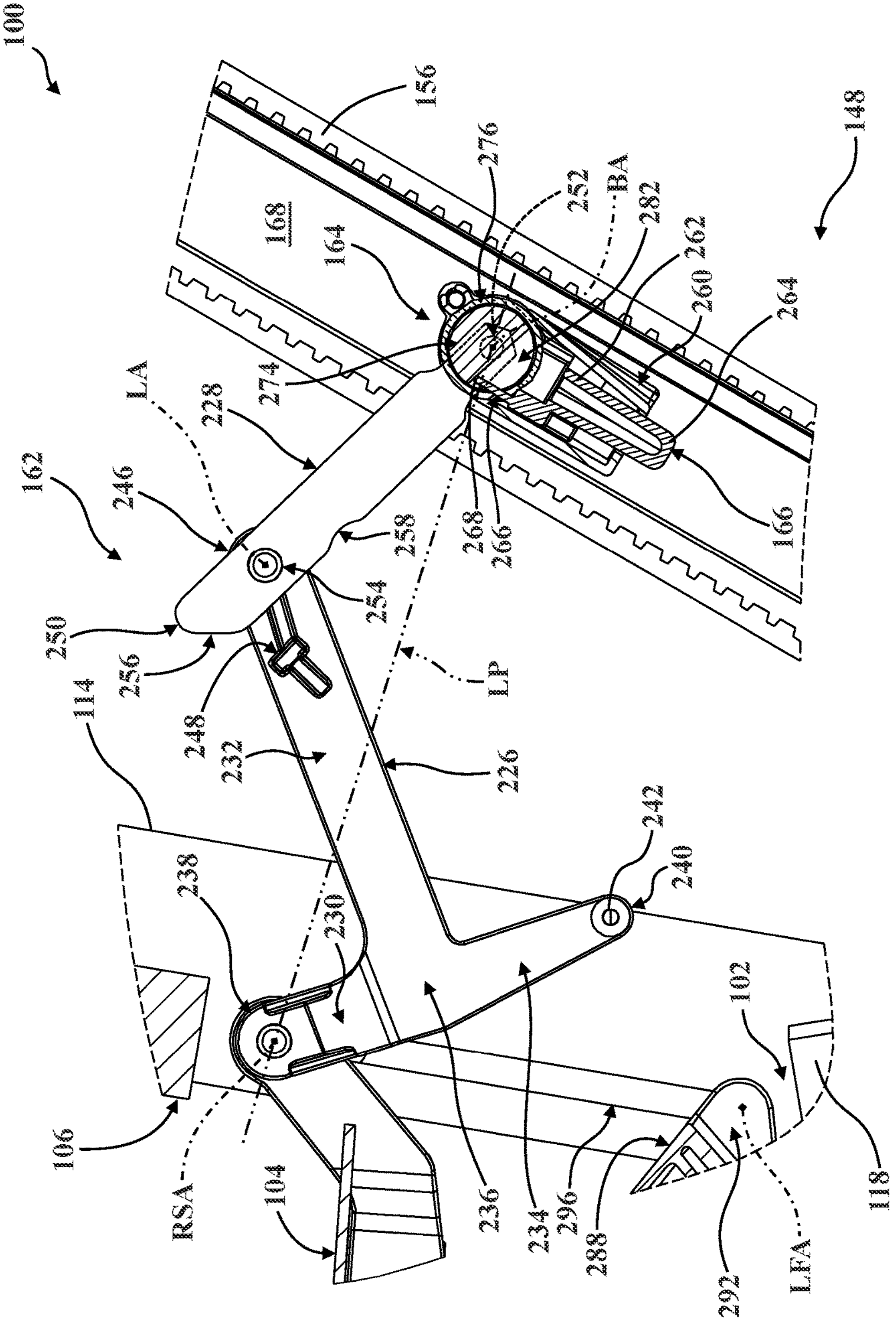
FIG. 9B is another partial section view of the portions of the patient transport apparatus depicted in FIG. 9A, shown with the track assembly having moved from the deployed position in response to engagement of the deployment lock release of the deployment lock mechanism.

More specifically, when the track assemblies 154 move to the deployed position 154B, the link axis LA is arranged below a linkage plane LP defined extending through the rear seat axis RSA and the barrel axis BA, and will remain in the deployed position 154B until the link axis LA is moved above the linkage plane LP (see FIG. 9B). To this end, the caregiver can engage the deployment button 264 to bring the push tab ends 268 of the push tabs 266 into engagement with the push notches 282 formed in the barrel 274 which, in turn, rotates the barrel 274 about the barrel axis BA as the push tab ends 268 contact the barrel 274 within the push notches 282, and pivots the brace links 228 about the barrel axis BA to cause the link axis LA to move above the linkage plane LP as shown in FIG. 9B. It will be appreciated that the deployment lock mechanism 164 could be configured in other ways sufficient to releasably lock the track assemblies 154 in the retracted position 154A and the deployed position 154B, and it is contemplated that one lock mechanism could lock the track assemblies 154 in the retracted position 154A while a different lock mechanism could lock the track assemblies 154 in the deployed position 154B. Other configurations are contemplated.

Figure 10:
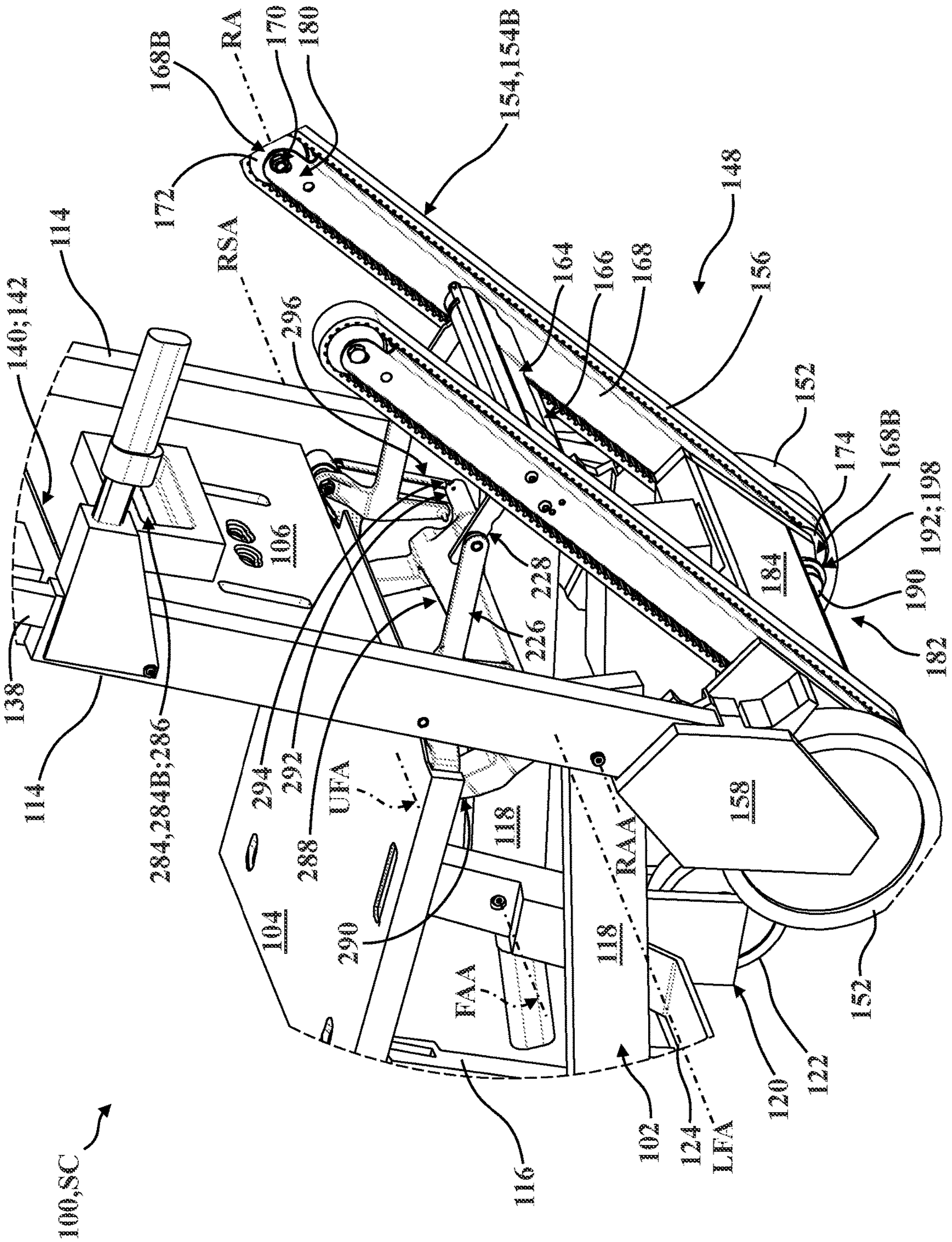
FIG. 10 is a partial rear perspective view of the patient transport apparatus of FIGS. 1-9B, showing additional detail of the folding lock mechanism.
Figure 11A:
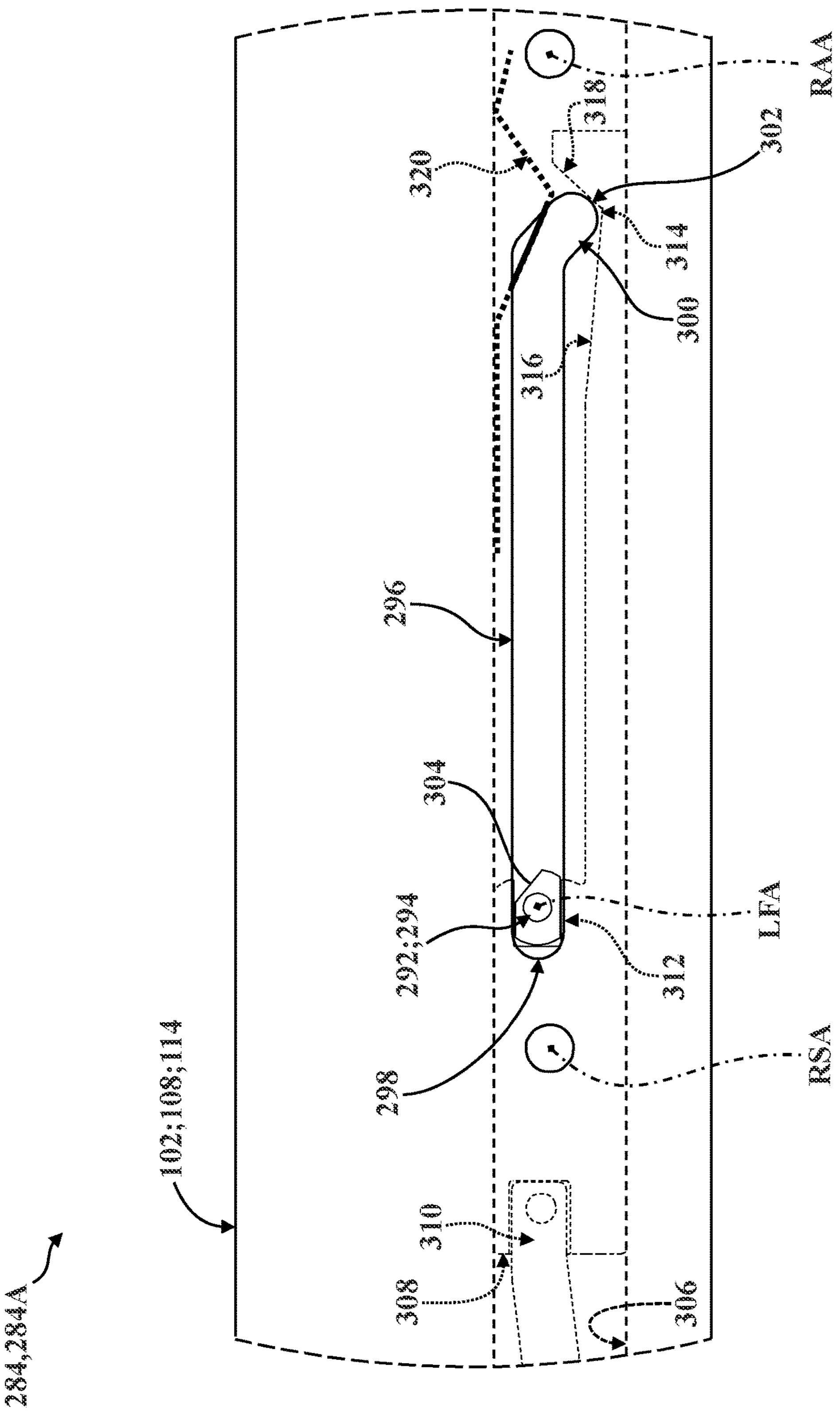
FIG. 11A is a partial schematic view of portions of the folding lock mechanism of the patient transport apparatus of FIGS. 1-10, shown arranged in a stow lock configuration corresponding to the stowed configuration as depicted in FIG. 5.
Figure 11B:
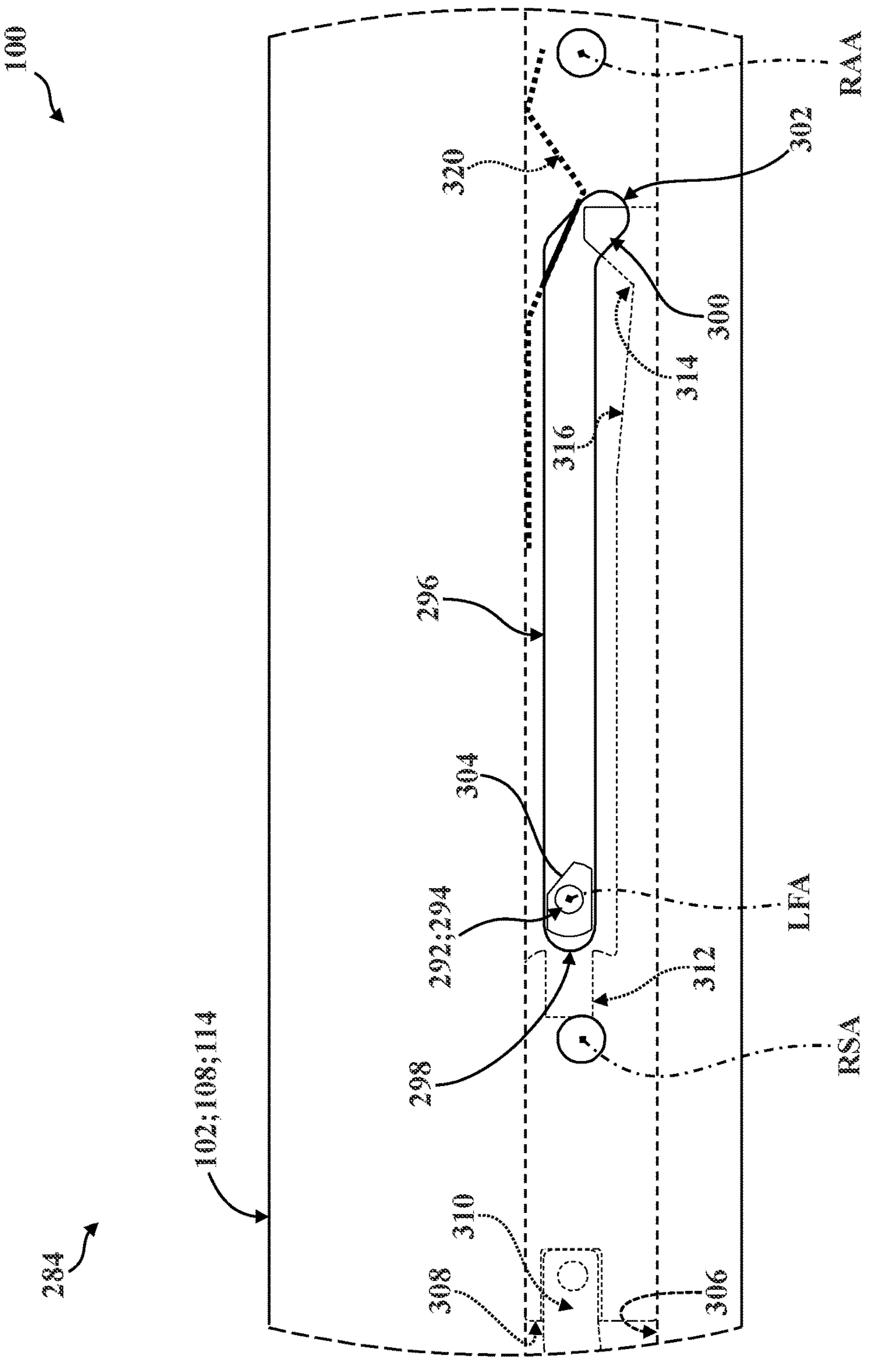
FIG. 11B is another partial schematic view of the portions of the folding lock mechanism of FIG. 11A, shown having moved out of the stow lock configuration to enable operation in the chair configuration as depicted in FIG. 6A.
Figure 11C:
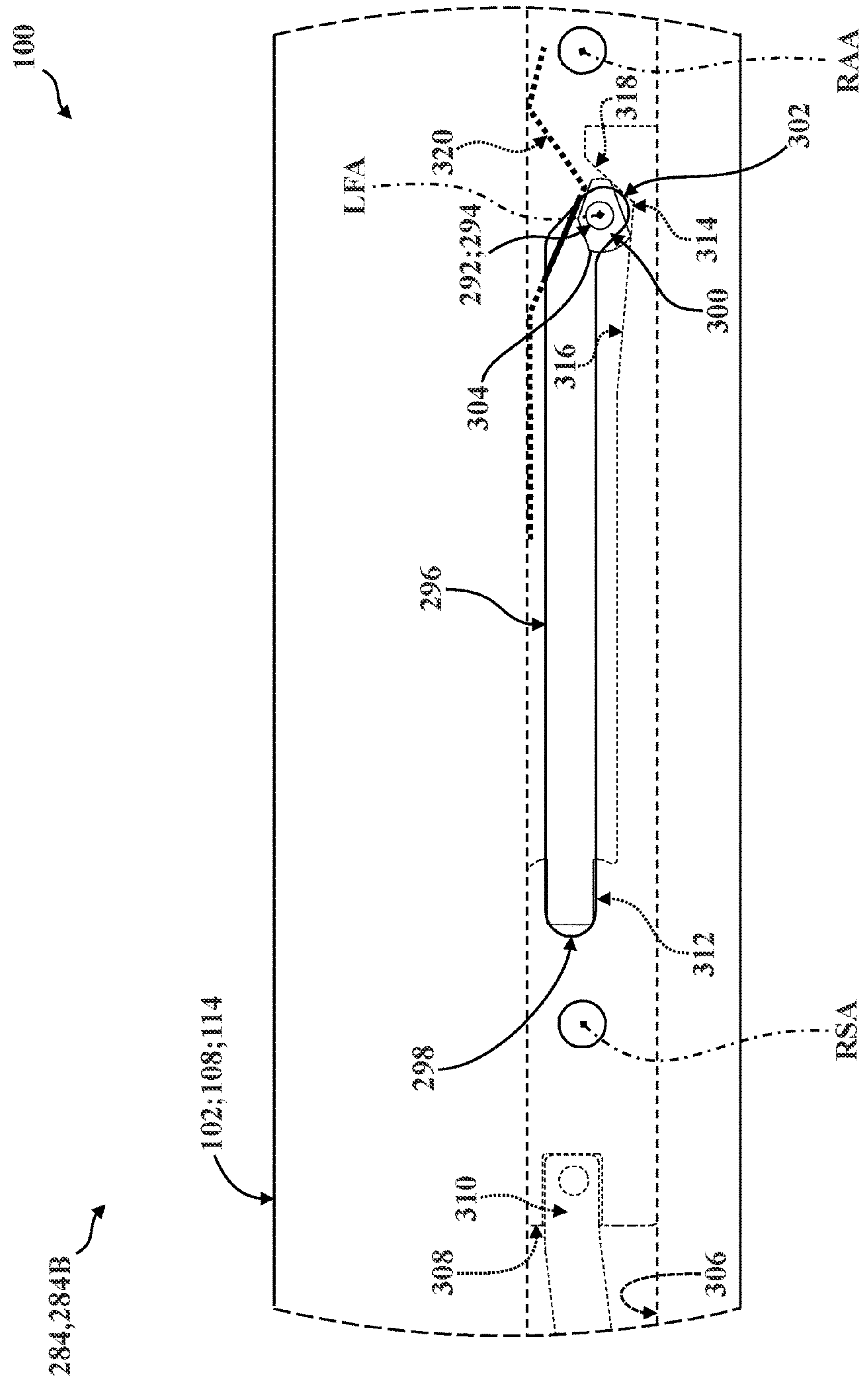
FIG. 11C is another partial schematic view of the portions of the folding lock mechanism of FIGS. 11A-11B, shown arranged in a use lock configuration corresponding to the chair configuration as depicted in FIG. 6A.
Figure 11D:
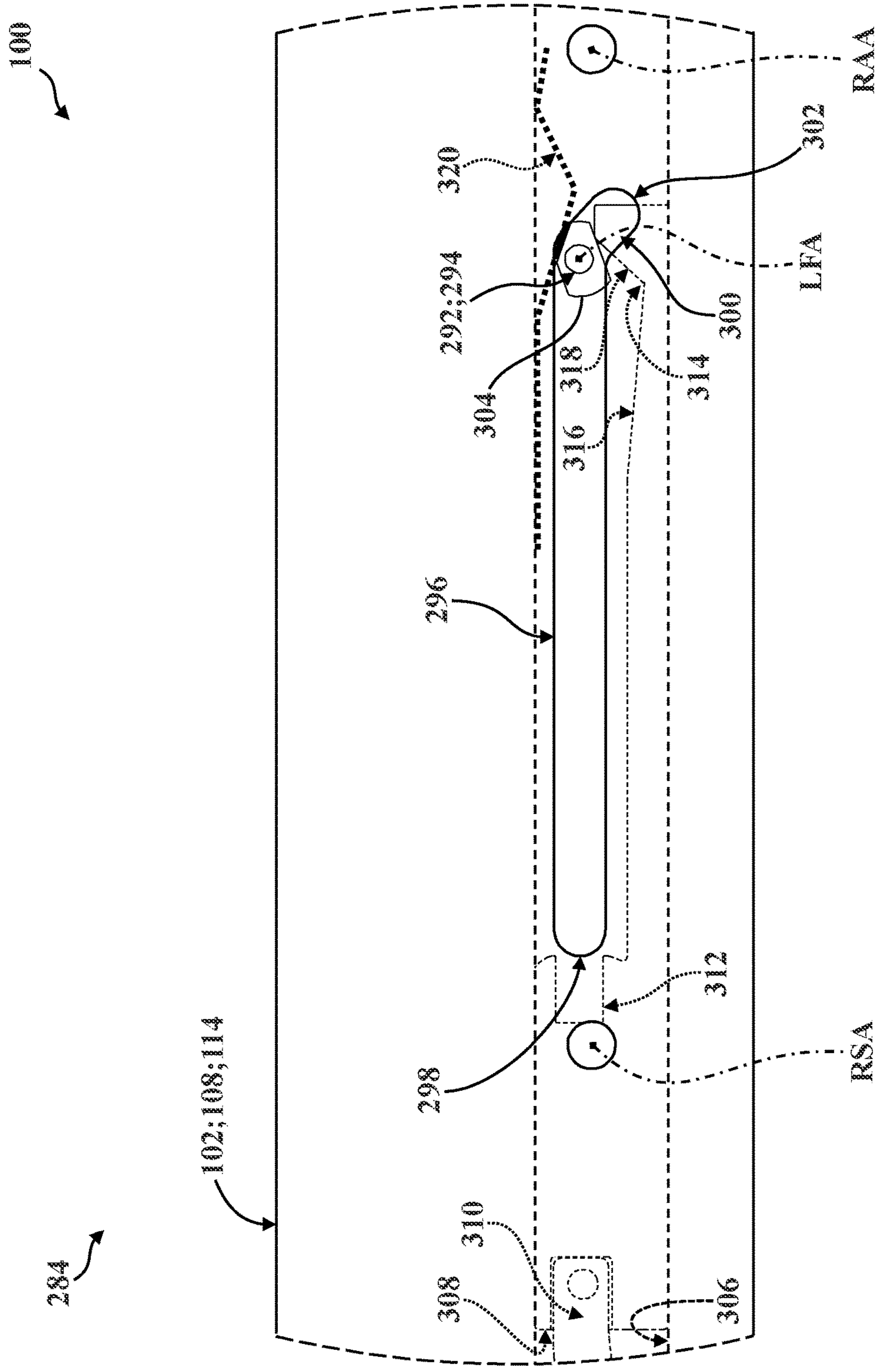
FIG. 11D is another partial schematic view of the portions of the folding lock mechanism of FIGS. 11A-11C, shown having moved out of the use lock configuration to enable operation in the stowed configuration as depicted in FIG. 5.

Referring now to FIGS. 10-11D, the patient transport apparatus 100 employs a folding lock mechanism 284 to facilitate changing between the stowed configuration WC (see FIG. 5) and the chair configuration CC (see FIG. 6A). To this end, the folding lock mechanism 284 generally comprises a folding lock release 286 (see FIG. 10) operatively attached to the back section 106 and arranged for engagement by the caregiver to releasably secure the folding lock mechanism 284 between a stow lock configuration 284A to maintain the stowed configuration WC, and a use lock configuration 284B to prevent movement to the stowed configuration WC from the chair configuration CC or from the stair configuration SC. To this end, the folding lock mechanism 284 generally comprises a folding link 288 with folding pivot mounts 290 and sliding pivot mounts 292. The folding pivot mounts 290 are pivotably coupled to the seat section 104 about an upper folding axis UFA that is arranged between the rear seat axis RSA and the front seat axis FSA (see FIGS. 2 and 6A-6B; pivoting not shown in detail). The sliding pivot mounts 292 each comprise a keeper shaft 294 which extends along a lower folding axis LFA which is arranged substantially parallel to the upper folding axis UFA. The keeper shafts 294 are disposed within and slide along slots 296 formed in each of the rear uprights 114. For the illustrative purposes, the keeper shafts 294 are shown in FIGS. 11A-11D as sized significantly smaller than the width of the slots 296. The slots 296 extend generally vertically along the rear uprights 114 between an upper slot end 298 and a transition slot region 300, and extend at an angle from the transition slot region 300 to a lower slot end 302. The slots 296 are disposed vertically between the rear seat axis RSA and the rear arm axis RAA in the illustrated embodiment. In some embodiments, the folding link 288, the slots 296, and or other portions of the folding lock mechanism 284 may be similar to as is disclosed in U.S. Pat. No. 6,648,343, previously referenced. Other configurations are contemplated.

In the representative embodiment illustrated herein, the folding lock mechanism 284 is configured to selectively retain the keeper shafts 294 adjacent to the upper slot ends 298 of the slots 296 in the stow lock configuration 284A (see FIG. 11A), and to selectively retain the keeper shafts 294 adjacent to the lower slot ends 302 of the slots 296 in the use lock configuration 284B (see FIG. 11C). To this end, keeper elements 304 are coupled to the keeper shafts 294 and move within upright channels 306 formed in the rear uprights 114. Here too, a carriage 308 is slidably supported within the upright channels 306 for movement relative to the slots 296 in response to engagement of the folding lock release 286 via the caregiver. A folding linkage assembly 310 generally extends in force-translating relationship between the folding lock release 286 and the carriage 308. While not shown in detail, the folding lock release 286 is supported by the back section 106 and moves in response to engagement by the caregiver, and the folding linkage assembly 310 comprises one or more components which may extend through the back section 106 and into the rear uprights 114 in order to facilitate movement of the carriage 308 within the upright channels 306 in response to user engagement of the folding lock release 286. As will be appreciated from the subsequent description below, FIGS. 11A and 11C represent an absence of user engagement with the folding lock release 286, whereas FIGS. 11B and 11D represent user engagement with the folding lock release 286.

The carriage 308 generally defines an upper pocket 312 shaped to receive and accommodate the keeper element 304 when the folding lock mechanism 284 is in the stow lock configuration 284A with the patient transport apparatus 100 arranged in the stowed configuration WC, and a lower pocket 314 shaped to receive and accommodate the keeper element 304 when the folding lock mechanism 284 is in the use lock configuration 284B with the patient transport apparatus 100 arranged in the chair configuration CC or in the stair configuration SC. In the illustrated embodiment, the upper pocket 312 has a generally U-shaped profile and the lower pocket 314 has a generally V-shape profile which defines a upper ramp 316 and a lower ramp 318. The keeper element 304 has a pair of substantially parallel sides which are shaped to be received within the upper pocket 312 (not shown in detail).

As shown in FIG. 11A, engagement between the keeper element 304 and the upper pocket 312 of the carriage 308 prevents movement of the keeper shaft 294 along the slot 296. When the caregiver engages the folding lock release 286 to move the folding lock mechanism 284 out of the stow lock configuration 284A, the corresponding movement of the folding linkage assembly 310 causes the carriage 308 to travel vertically upwardly within the upright channel 306 until the keeper element 304 comes out of engagement with the upper pocket 312, as shown in FIG. 11B. Here, the keeper shaft 294 can subsequently traverse the slot 296 toward the lower slot end 302 in order to move to the use lock configuration 284B depicted in FIG. 11C (movement not shown; compare FIG. 11B to FIG. 11C). While not shown, it will be appreciated that the carriage 308, the folding linkage assembly 310, and or the folding lock release 286 may comprise one or more biasing elements arranged to urge the carriage 308 vertically down the upright channel 306.

When in the use lock configuration 284B depicted in FIG. 11C, the keeper shaft 294 is disposed adjacent to the lower slot end 302 of the slot 296 such that the keeper element 304 is generally disposed adjacent to or otherwise in the lower pocket 314, such as in contact with the upper ramp 316 and the lower ramp 318. Here, the keeper element 304 is retained via a folding lock biasing element 320 (depicted schematically) that is coupled to the rear upright 114 (e.g., disposed within the upright channel 306). The keeper element 304 has a pair of substantially parallel sides which are shaped to be received within the upper pocket 312 (not shown in detail). The engagement between the keeper element 304 and folding lock biasing element 320 urges the keeper shaft 294 toward the lower slot end 302 of the slot 296 to maintain operation in the use lock configuration 284B depicted in FIG. 11C. When the caregiver engages the folding lock release 286 to move the folding lock mechanism 284 out of the use lock configuration 284B, the corresponding movement of the folding linkage assembly 310 causes the carriage 308 to travel vertically upwardly within the upright channel 306. Here, as the lower ramp 318 of the carriage 308 defined by the lower pocket 314 moves together with the keeper element 304 disposed in engagement therewith, the folding lock biasing element 320 compresses as the keeper shaft 294 travels out of the transition slot region 300, as shown in FIG. 11D. Here, the keeper shaft 294 can subsequently traverse the slot 296 toward the upper slot end 298 in order to move to the stow lock configuration 284A depicted in FIG. 11A (movement not shown; compare FIG. 11D to FIG. 11A). It will be appreciated that the folding lock mechanism 284 could be configured in other ways sufficient to releasably lock the patient transport apparatus in the stowed configuration WC, the stair configuration SC, and the chair configuration CC, and it is contemplated that one lock mechanism could lock the patient transport apparatus 100 in the stowed configuration WC while a different lock mechanism could lock the patient transport apparatus 100 in the stair configuration SC and/or the chair configuration CC. Other configurations are contemplated.

FIGS. 12A-12I successively depict exemplary steps of transporting a patient supported on the patient transport apparatus 100 down stairs ST. In FIG. 12A, a first caregiver is shown engaging the pivoting handle assemblies 130 in the engagement position 130B to illustrate approaching stairs ST while the patient transport apparatus 100 is moved along floor surfaces FS in the chair configuration CC. FIG. 12B depicts a second caregiver engaging the front handle assemblies 128 after having moved them to the extended position 128B. In FIG. 12C, the patient transport apparatus 100 has been moved closer to the stairs ST with the first caregiver still engaging the pivoting handle assemblies 130 and with the second caregiver still engaging the front handle assemblies 128. In FIG. 12D, the first caregiver has moved the handle assembly 132 to the extended position 132B as the second caregiver continues to engage the front handle assemblies 128.

In FIG. 12E, the first caregiver has engaged the deployment lock release 166 to move the patient transport apparatus 100 out of the chair configuration CC and into the stair configuration SC. Here, the track assemblies 154 are shown arranged between the retracted position 154A and the deployed position 154B, and the rear wheels 152 move closer to the front wheels 122, as the first caregiver pulls the track assemblies 154 away from the back section 106. In FIG. 12F, the patient transport apparatus 100 is shown in the stair configuration SC with the track assemblies 154 arranged in the deployed positionl 54B. Here, the rear wheels 152 are positioned significantly closer to the front wheels 122 compared to operation in the chair configuration CC, and are also arranged further under the seat section 104. It will be appreciated that transitioning the patient transport apparatus 100 from the chair configuration CC to the stair configuration SC has resulted in minimal patient movement relative to the support structure 102 as the carrier assembly 148 pivots about the hub axis HA and moves the rear wheels 152 closer to the front wheels 122 in response to movement of the track assemblies 154 to the deployed position 154B.

Furthermore, while the arrangement of patient's center of gravity has not changed significantly relative to the support structure 102, the longitudinal distance which extends between the patient's center of gravity and the location at which the rear wheels 152 contact the floor surface FS has shortened considerably. Because of this, the process of "tilting" the patient transport apparatus 100 (e.g., about the rear wheels 152) to transition toward contact between the track assemblies 154 and the stairs ST, as depicted in FIG. 12G, is significantly more comfortable for the patient than would otherwise be the case if the patient transport apparatus 100 were "tilted" about the rear wheels 152 from the chair configuration CC (e.g., with the rear wheels 152 positioned further away from the front wheels 122). Put differently, the arrangement depicted in FIG. 12G is such that the patient is much less likely to feel uncomfortable, unstable, or as if they are "falling backwards" during the "tilting" process. Here too, the caregivers are afforded with similar advantages in handling the patient transport apparatus 100, as the arrangement of the rear wheel 152 described above also makes the "tilting" process easier to control and execute.

In FIG. 12H, the caregivers are shown continuing to support the patient transport apparatus 100 in the stair configuration SC as the belts 156 of the track assemblies 154 are brought into contact with the edge of the top stair ST. In FIG. 12I, the caregivers are shown continuing to support the patient transport apparatus 100 in the stair configuration SC as the belts 156 of the track assemblies 154 contact multiple stairs ST during descent.

Referring now to FIGS. 13A-15D, as noted above, the track assemblies 154 each comprise a belt tensioner 180 configured to adjust tension in the belt 156 between the roller 172 and the drive pulley 174. The belt tensioners 180 may function to enable selectively adjusting tension in the belts 156 to a desired tautness. For example, the belts 156 may need to be tightened or loosened depending on the type of belt 156 being utilized, the condition of the belt 156 (e.g., based on time, number of uses, and the like), expected use conditions (e.g., the geometry of stairs ST, such as based on building codes), the capacity of the drive system 182, and the like. To this end, and as is described in greater detail below, the belt tensioner 180 of the present disclosure generally comprises a guide 322, a keeper 324, a brace 326, and a tensioning cam 328. The guide 322 supports the axle 170 for movement relative to the rail 168. The keeper 324 is coupled to the axle 170 and is operable between a disengaged configuration 324A (see FIG. 13B) and an engaged configuration 324B (see FIG. 13A). In the disengaged configuration 324A, the keeper 324 permits movement of the axle 170 relative to the rail 168. In the engaged configuration 324B, the keeper 324 restricts movement of the axle 170 relative to the rail 168. The brace 326 is operatively attached to the rail 168 adjacent to the guide 322. The tensioning cam 328 is coupled to the axle 170 and defines a plurality of relief catches 330 arranged for engagement with the brace 326. The relief catches 330 are each shaped to remain in selective engagement with the brace 326 effected by concurrent movement of the axle 170 and the tensioning cam 328 to tension the belt 156 against the roller 172 while the keeper 324 operates in the disengaged configuration 324A 324B. Each of the components of the belt tensioner 180 introduced above will be described in greater detail below.

As noted above, the belt tensioner 180 of the present disclosure can hold the tensioning cam 328 in a desired position (e.g., such that the brace 326 remains in engagement with a particular one of the plurality of relief catches 330) without the user having to otherwise "manually" hold unsecured components in place which would otherwise move away from each other due to tension in the belt 156. Furthermore, and as will be appreciated from the subsequent description below, the belt tensioner 180 disclosed herein can enable a single user (e.g., a service technician) to adjust tension in the belts 156 in a simple, efficient, and reliable fashion.

Figure 14:
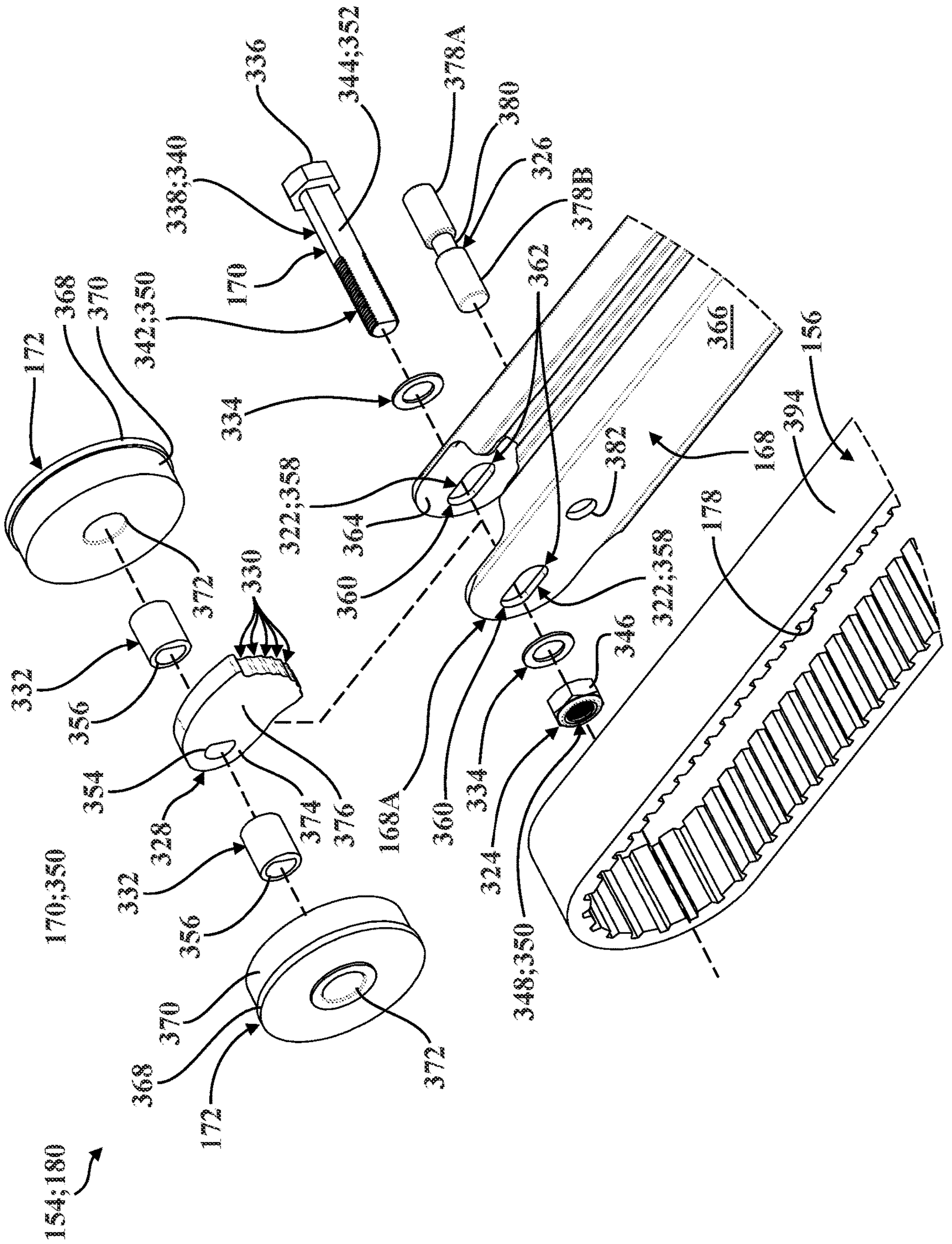
FIG. 14 is an exploded partial perspective view of the portions of the track assembly depicted in FIGS. 13A-13B.

As is best depicted in FIG. 14, the representative embodiment of the belt tensioner 180 illustrated herein employs the axle 170 to support one or more rollers 172, the tensioning cam 328, one or more spacers 332, and one or more washers 334 along the roller axis RA. The axle 170 is supported extending through the guide 322 arranged adjacent to the first rail end 168A of the rail 168. The axle 170 is configured move relative to the rail 168 between a plurality of axle positions (e.g., first, second, third, and fourth axle positions 170A, 170B, 170C, 170D; see FIGS. 15A-15D) along the guide 322. In the illustrated embodiments, one or more spacers 332 are operatively attached to the axle 170 and support the one or more rollers 172 for rotation about the roller axis RA (e.g., rotation relative to the axle 170) Thus, and as will be appreciated from the subsequent description below, the axle 170 and any other components of the belt tensioner 180 supported by the axle 170 (e.g., the rollers 172) are allowed to move along the guide 322 when the keeper 324 operates in the disengaged configuration 324A (see FIG. 13B), but are restricted from movement along the guide 322 when the keeper 324 operates in the engaged configuration 324B (see FIG. 13A).

In the representative embodiment illustrated herein, the axle 170 is realized as a partially-threaded bolt having a bolt head portion 336 and a bolt body portion 338, the body portion 338 defining a shank 340 and external threads 342, with a flat 344 extending along the body portion 338 (see FIG. 14). Here, the keeper 324 is realized as nut having a nut body 346 defining internal threads 348 shape to engage the external threads 342 of the bolt body portion 338 of the axle 170 in threaded engagement 350 (see FIGS. 13A-13B). Thus, in the representative embodiment illustrated herein, the disengaged configuration 324A of the keeper 324 may be defined when the threaded engagement 350 is "loose" or detached such that the axle 170 can travel along the guide 322, while the engaged configuration 324B may be defined when the threaded engagement 350 is "tight" and restricts movement of the axle 170 along the guide 322. Put differently, the keeper 324 is disposed in threaded engagement 350 with the axle 170 to operate in the engaged configuration 324B (see FIG. 13A) when the keeper 324 is tightened along the axle 170 to prevent the axle 170 from moving relative to the rail 168, and to operate in the disengaged configuration 324A (see FIG. 13B) when the keeper 324 is loosened along the axle 170 to permit movement of the axle 170 relative to the rail 168. However, and as will be appreciated from the subsequent description below, the axle 170 and/or the keeper 324 could be configured in various ways consistent with the present disclosure. In some embodiments, the axle 170 may be realized a pin, a bolt, a shaft, a rod, or the like. The axle 170 may have a may have any shape, diameter, length, or a combination thereof that allows the axle 170 to extend disposed through the rail 168 and one or more guides 322. Similarly, the keeper 324 may be of any suitable configuration sufficient to cooperate with the axle 170 between the disengaged configuration 324A and the engaged configuration 324B described above.

In the illustrated embodiments, the tensioning cam 328 is keyed to the axle 170 such that the tensioning cam 328 and the axle 170 rotate concurrently about the roller axis RA in response to applied rotational force when the keeper 324 operates in the disengaged configuration 324A. To this end, one of the axle 170 and the tensioning cam 328 defines a key feature 352, and the other of the axle 170 and the tensioning cam 328 defines a keyway feature 354 with a profile that is complimentary to the key feature 352. In the representative embodiment illustrated herein, and as is best depicted in FIG. 14, the flat 344 of the axle 170 generally defines the key feature 352, and the tensioning cam 328 defines the keyway feature 354. Here, the key feature 352 and the keyway feature 354 each have generally D-shaped profiles which are complimentary to each other and are configured to facilitate a "rotational lock" between the axle 170 and the tensioning cam 328. However, those having ordinary skill in the art will appreciated that concurrent rotation of the axle 170 and the tensioning cam 328 could be achieved in a number of different ways without departing from the scope of the present disclosure. By way of non-limiting example, the tensioning cam 328 could be splined, welded, bonded, adhered, or otherwise fixed to the axle 170 in various ways. The key feature 352 of the axle 170 may also interlock with keyway features formed in other components of the belt tensioner 180, such as in spacer keyway features 356 of the spacers 332. Other configurations are contemplated.

As noted above, the guide 322 supports the axle 170 for movement relative to the rail 168 when the keeper 324 operates in the disengaged configuration 324A. In the illustrated embodiments, the axle 170 extends through one or more guides 322 which are realized as slots 358 formed in the rails 168. Each slot 358 each extends between or otherwise defines a respective first slot end 360and a second slot end 362, with the axle 170 supported for movement between the first slot end 360 and the second slot end 362 when the keeper 324 operates in the disengaged configuration 324A. Here, the rails 168 have a hollow, generally rectangular profile defining opposing first and second side walls 364, 366 in which the slots 358 are formed.

The rollers 172 of the belt tensioners 180 engage the belts 156 and are supported for rotation about the roller axis RA in order to facilitate corresponding movement of the belts 156 relative to the rails 168. In addition, the rollers 172 also facilitate placing tension in the belts 156 based on movement of the axles 170 along the slots 358 of the guides 322 as the tensioning cam 328 is rotated to bring different relief catches 330 into engagement with the brace 326, as noted above and as is described in greater detail below. While each track assembly 154 depicted in the representative embodiment illustrated herein employs a single belt tensioner 180 which utilizes two rollers 172 rotatably supported in bearing contact with respective spacers 332, it will be appreciated that different configurations are contemplated, and different quantities of rollers 172 could be utilized.

As is best depicted in FIG. 14, in some embodiments, the rollers 172 comprise a flange 368 and a riding surface 370 which help facilitate proper alignment of the belt 156 and are generally shaped and arranged so as to be complimentarily to the profile of the belts 156. As noted above, the rollers 172 move with, but rotate relative to, the axle 170, and are supported in bearing-type contact with the spacers 332. To this end, each of the rollers 172 defines or otherwise comprises a central aperture 372 which receives one of the spacers 332, and is shaped to facilitate rotation of the roller 172 about the roller axis RA. However, other configurations are contemplated and, depending on the specific configuration of the axle 170 and/or other parts of the belt tensioner 180, the rollers 172 could be rotatably supported by the axle 170 without the use of spacers 332. Furthermore, various arrangements of bearings could be utilized to promote rotation of the rollers 172 about the roller axis RA (e.g., ball bearings operatively attached to the rollers 172; not shown).

Figure 15A:
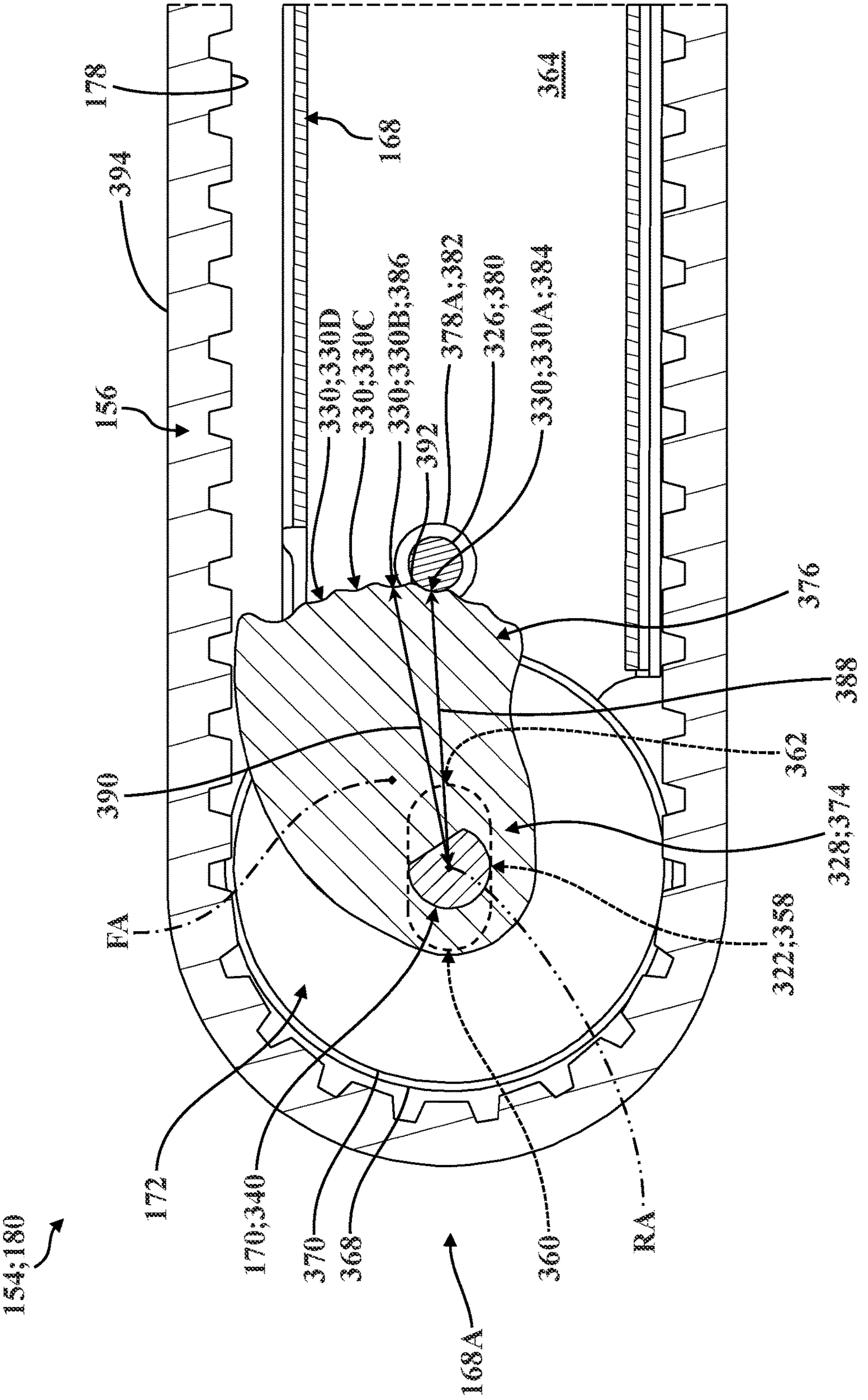
FIG. 15A is a partial section view of the track assembly generally taken through plane 15 of FIG. 13B, shown with the belt tensioner having a tensioning cam having a first, second, third, and fourth relief catch, and with the first relief catch engaging a brace to tension a belt.
Figure 15B:
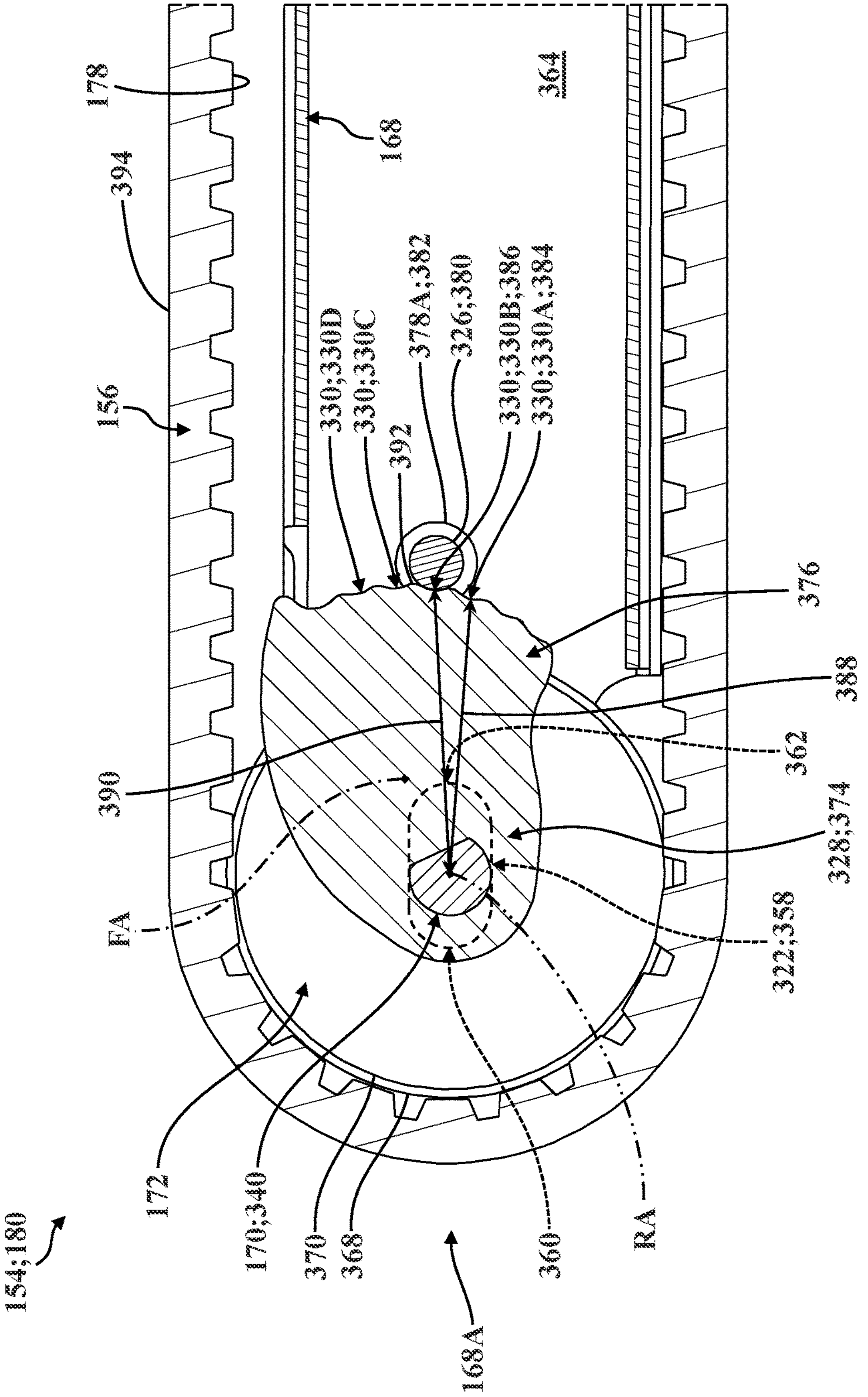
FIG. 15B is another partial section view of the track assembly of FIG. 15A, shown with the second relief catch of the tensioning cam engaging the brace to increase tension in the belt
Figure 15C:
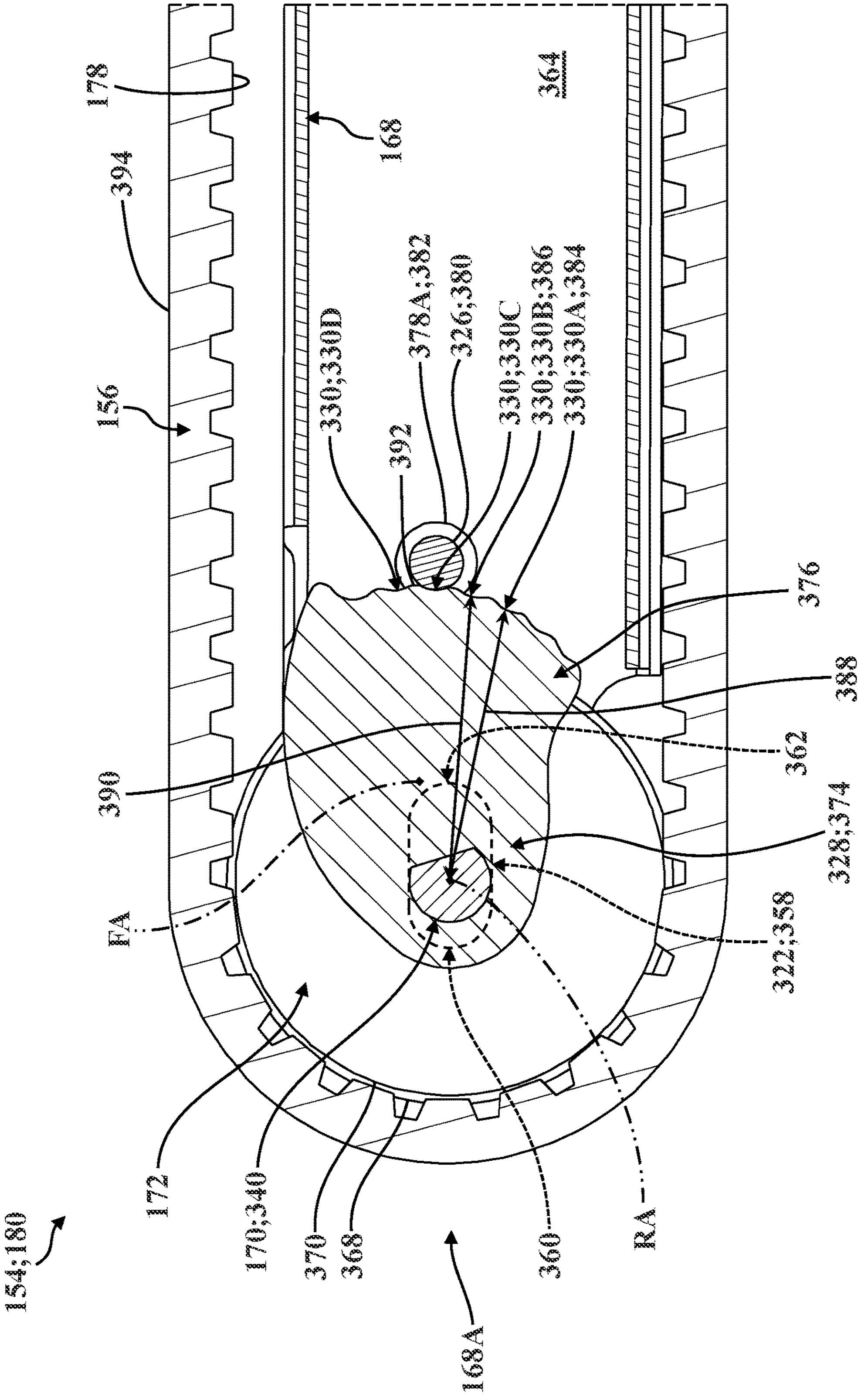
FIG. 15C is another partial section view of the track assembly of FIGS. 15A-15B, shown with the third relief catch of the tensioning cam engaging the brace to further increase tension in the belt.
Figure 15D:
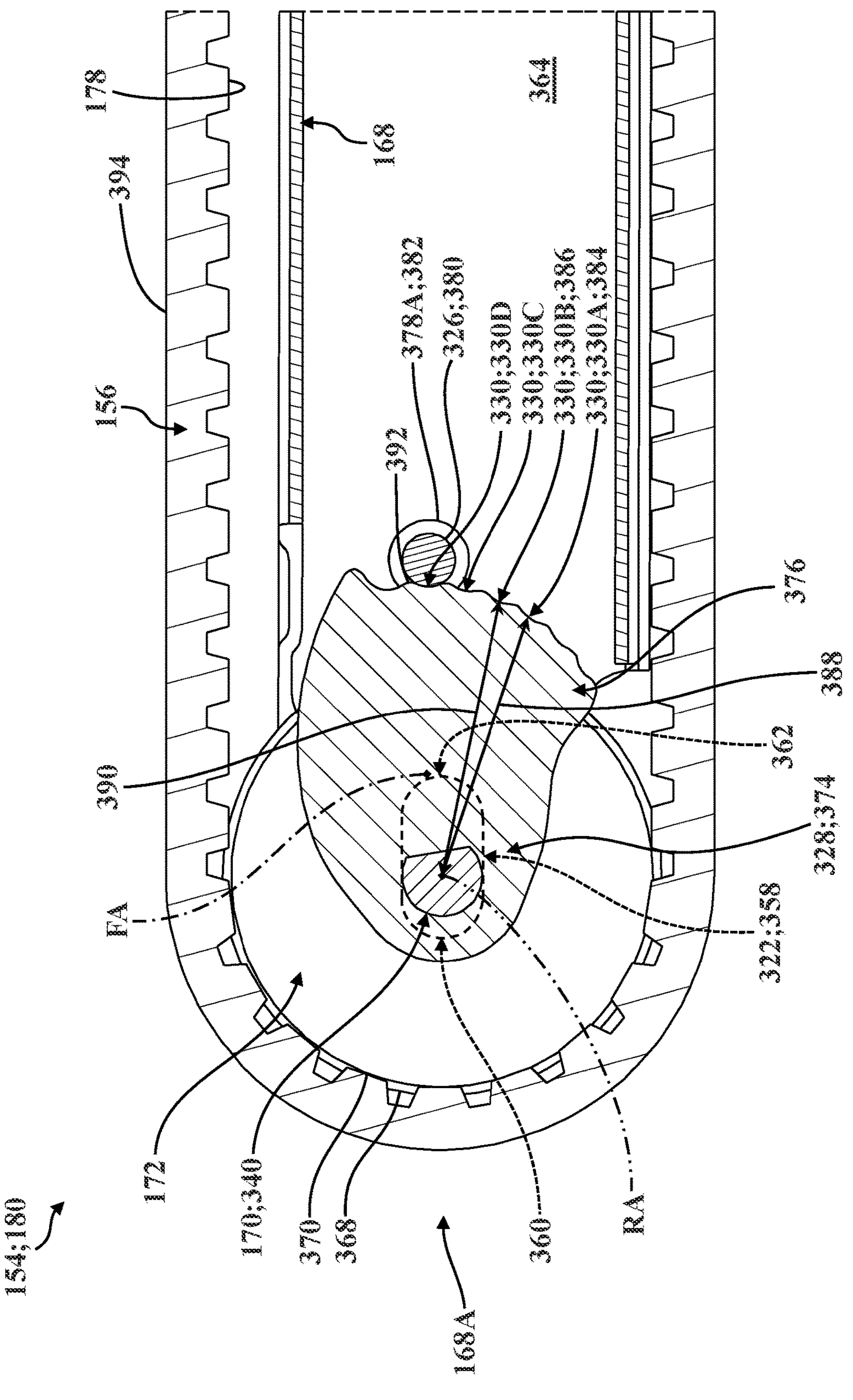
FIG. 15D is another partial section view of the track assembly of FIGS. 15A-15C, shown with the fourth relief catch of the tensioning cam engaging the brace to still further increase tension in the belt.

Referring now to FIGS. 14-15D, as noted above, the belt tensioner 180 employs the tensioning cam 328 to facilitate tensioning the belt 156 and maintaining tension in the belt 156 based on engagement between the brace 326 and the plurality of relief catches 330. Here, the tensioning cam 328 may function to adjust the linear location of the roller 172 and the axle 170 between the first and second slot ends 360, 360 of the slots 358 of the guide 322 by converting rotational movement of the axle 170 about the roller axis RA into translational linear movement of the roller axis RA relative to the rail 168 in order to adjust the tension applied to the belt 156. In the representative embodiment illustrated herein, the tensioning cam 328 comprises a base portion 374 arranged about the roller axis RA, and a follower portion 376 arranged about a follower axis FA and at least partially defining the plurality of relief catches 330. In the illustrated embodiments, the tensioning cam 328 is formed as a unitary, one-piece component such that the base portion 374 merges with the follower portion 376 without specific structure to delineate the two. Nevertheless, the base portion 374 is defined by whichever portion of the tensioning cam 328 engages the axle 170 for concurrent rotation about the roller axis RA (e.g., the keyway feature 354), and the follower portion 376 is defined by whichever portion of the tensioning cam 328 includes or otherwise defines the plurality of relief catches 330 arranged about the follower axis FA. The follower axis FA is offset from the roller axis RA and is substantially parallel to the roller axis. This configuration affords mechanical advantage (e.g., as a cam) to the follower portion 376. In the representative embodiment illustrated herein, the plurality of relief catches 330 are radially-spaced along the follower portion 376, are spaced substantially equidistant from each other (e.g., with respect to the follower axis FA), and have substantially arc-shaped profiles. However, other configurations are contemplated.

As noted above, the relief catches 330 are each shaped and arranged for engagement with the brace 326 and remain in selective engagement with the brace 326. More specifically, and as is best depicted in FIG. 14, the representative embodiment of the brace 326 illustrated herein comprises first and second mounting shafts 378A, 378B with a necked shaft 380 extending between the first and second mounting shafts 378A, 378B. The necked shaft 380 is shaped to engage the relief catches 330, and the first and second mounting shafts 378A, 378B are seated in respective shaft apertures 382 formed in the rails 168 (not shown in detail) . The first and second mounting shafts 378A, 378B align the brace 326 to the rails 168, and may be employed to secure the brace 326 to the rails 168 with various conventional manufacturing methods (e.g., via peening, welding, bonding, riveting, and the like).

In some embodiments, the plurality of relief catches 330 includes a first relief catch 330A defining a first apex 384, and a second relief catch 330B defining a second apex 386. The second relief catch 330B is disposed adjacent to the first relief catch 330A along the follower portion 376 of the tensioning cam 328. Here, engagement occurring between the first relief catch 330A and the necked shaft 380 of the brace 326 positions the first apex 384 at a first reference distance 388 from the roller axis RA and also positions the second apex 386 at a second reference distance 390 from the roller axis RA, with the second reference distance 390 being larger than the first reference distance 388. Put differently, the first apex 384 is arranged closer to the roller axis RA than the second apex 386. This relationship persists between adjacent relief catches 330 in the illustrated embodiment. For the purposes of clarity and consistency, a total of four relief catches 330 are labeled in FIGS. 15A-15D; a first relief catch 330A, a second relief catch 330B, a third relief catch 330C, and a fourth relief catch 330D and are depicted in successive engagement with the necked shaft 380 of the brace 326 to depict progressive movement of the axle 170 within the slots 358 as the belt 156 is tightened (compare FIGS. 15A-15D) while the keeper 324 operates in the disengaged configuration 324A. While only four relief catches 330 are labeled in FIGS. 15A, 15D, additional (unlabeled) relief catches 330 are formed in the tensioning cam 328 in the illustrated embodiment. Those having ordinary skill in the art will appreciate that the tensioning cam 328 could be provided with various quantities of relief catches 330, including fewer than or more than four relief catches 330. Other configurations are contemplated.

As noted above, relief catches 330 have substantially arc-shaped profiles and are shaped in a complimentary fashion to the generally cylindrical profile of the necked shaft 380 of the brace 326. In the illustrated embodiment, transition faces 392 are arranged radially between adjacent relief catches 330 so as to form rounded "peaks" which likewise engage the brace 326 but are configured to urge the tensioning cam 328 towards engagement with one of the adjacent relief catches 330 which, in this illustrative example, form rounded "valleys" between the adjacent "peaks" defined by the transition faces 392.

As is depicted by successively comparing FIG. 15A with FIG. 15B, the tensioning cam 328 and the axle 170 move concurrently away from the second rail end 168B of the rail 168 (e.g., toward the first rail end 168A) as the brace 326 comes out of engagement with the first relief catch 330A and comes into engagement with the second relief catch 330B in response to rotational force applied to the axle 170 while the keeper 324 operates in the disengaged configuration 324. Here too, the axle 170 traverses the slot 358 and moves away from the second slot end 362 toward the first slot end 360.

In order to adjust tension in the belt 156, the user (e.g., a service technician) can place the keeper 324 in the disengaged configuration 324A, such as by loosening the threaded engagement 350 between the keeper 324 and the axle 170, and then using a tool (e.g., a wrench; not depicted) to apply rotational force (e.g., torque) to the bolt head portion 336 of the axle 170 to rotate the tensioning cam 328 from the arrangement depicted in FIG. 15A where the brace 326 is disposed in engagement with the first relief catch 330A, to the arrangement depicted in FIG. 15B where the brace 326 is disposed in engagement with the second relief catch 330B. Here, because the second relief catch 330B is disposed further away from the roller axis RA than the first relief catch 330A, the axle 170 moves along the slots 358 toward the first slot end 360. Furthermore, because the roller 172 moves concurrently with the axle 170, this movement of the axle 170 along the slot 358 also results in corresponding movement of the roller 172 relative to the rail 168 (e.g., toward the first rail end 168A). Here, the movement of the roller 172 relative to the rail 168 effects tightening the belt 156.

It will be appreciated that the configuration of the belt tensioner 180 described herein affords the user with the ability to progressively tighten the belt 156 by rotating the axle 170 to successively engage different adjacent relief catches 330. Moreover, because of how the relief catches 330 and the brace 326 engage, the belt tensioner 180 "holds" tension in the belt 156 even while the keeper 324 is in the disengaged configuration 324A. Put differently, the user can rotate the axle 170 to tighten the belt 156 and then rotate the keeper 324 relative to the axle 170 to place the keeper 324 in the engaged configuration 324B. Thus, tension in the belt 156 is maintained by the belt tensioner 180, rather than by persistent force applied by the user, as the user changes operation of the keeper 324 from the disengaged configuration 324A to the engaged configuration 324B (e.g., tightens the nut). It will be appreciated that this configuration affords significant advantages to the user during the process of adjusting tension in the belt 156, and allows the tension in the belt 156 to be adjusted in a predictable, reliable, and efficient fashion.

Figure 16:
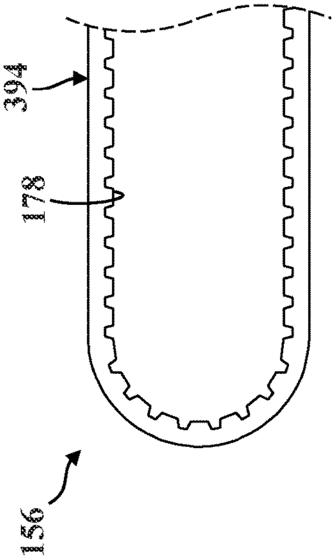
FIG. 16 is a partial side view of the belt of the track assembly of FIGS. 15A-15D.

As is best depicted in FIGS. 7B and 16, the belt 156 may have a generally smooth outer belt surface 394 in some embodiments, and may be tensioned between the roller 172 and the drive pulley 174. The roller 172 and the drive pulley 174 could be of various sizes, types, and configurations without departing from the scope of the present disclosure. In some embodiments, the roller 172 and the drive pulley 174 could be of similar size, or the drive pulley 174 could be larger (or smaller) than the roller 172. Furthermore, it will be appreciated that additional rollers 172 and/or drive pulleys 174 could be utilized in certain embodiments, such as to route the belt 156 at various angles and/or in various directions (e.g., with three or more "linear" regions between pulleys to define a "tank-like" configuration). Other configurations are contemplated.

Figure 17:
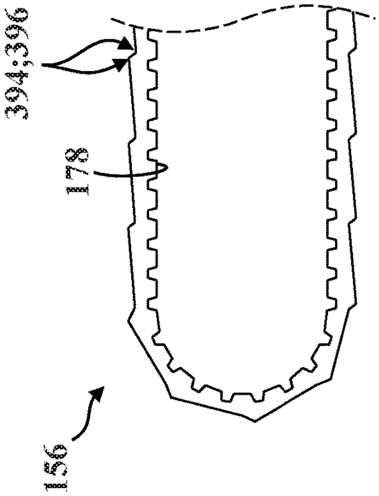
FIG. 17 is a partial side view of another embodiment of a belt for the track assembly of FIGS. 15A-15D, shown having a saw tooth configuration.
Figure 18:
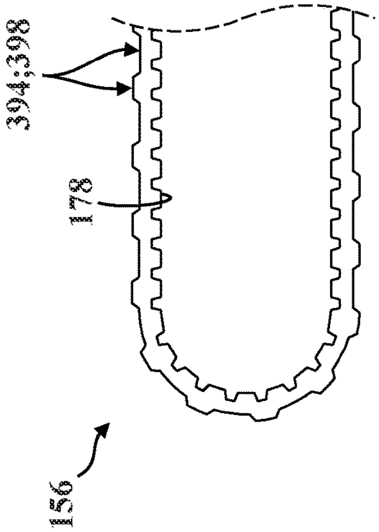
FIG. 18 is a partial side view of another embodiment of a belt for the track assembly of FIGS. 15A-15D, shown having a raised tread configuration.
Figure 19:
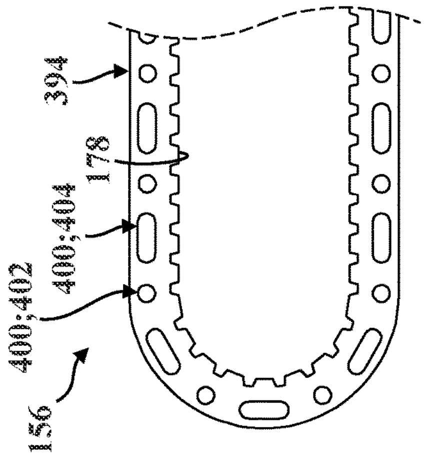
FIG. 19 is a partial side view of another embodiment of a belt for the track assembly of FIGS. 15A-15D, shown having internal voids.

As shown in FIG. 17, in some embodiments, the outer belt surface 394 of the belt 156 could define or otherwise comprise an "offset" saw tooth configuration 396 to help promote ascending and/or descending stairs ST. In some embodiments, a "non-offset" saw tooth configuration could be utilized (e.g., with successive triangular treads). Similarly, as shown in FIG. 18, the outer belt surface 394 of the belt 156 could define or otherwise comprise a raised tread configuration 398 to help promote ascending and/or descending stairs ST. Furthermore, as shown in FIG. 19, the belt 156 could comprise various arrangements of internals void 400 spaced from the outer belt surface 394. Here, internal voids 400 with a generally cylindrical first void profile 402 are provided along with (and interposed by) internal voids 400 with a generally rounded-rectangular second void profile 404. In some embodiments, internal voids 400 with the first void profile 402 but not the second void profile 4040 (or vice-versa) could be utilized. In some embodiments, some or all of the internal voids 400 could be sealed (not shown) from the outside environment to inhibit ingress of outside contaminants, and/or could be filled with a material different in composition that other portions of the belt 156. Other configurations are contemplated. In some embodiments, various configurations of belts 156 may be "stretch" about the roller 172 depending on it's size and/or shape, the material or materials from which the belts 156 are manufactured, and the like.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient transport apparatus configured to transport a patient along stairs, the patient transport apparatus comprising:
- a support structure;
- a track assembly pivotably coupled to the support structure, the track assembly comprising:
  - a rail defining a first rail end and a second rail end;
  - an axle defining a roller axis;
  - a first roller and a second roller each supported for rotation about the roller axis adjacent to the first rail end of the rail, wherein the first roller is spaced from the second roller along the roller axis;
  - a belt disposed in engagement with the first roller and the second roller and arranged for movement relative to the rail in response to rotation of the first roller and the second roller about the roller axis;
  - a guide supporting the axle for movement relative to the rail;
  - a keeper coupled to the axle and operable between a disengaged configuration to permit movement of the axle relative to the rail, and an engaged configuration to restrict movement of the axle relative to the rail;
  - a brace operatively attached to the rail adjacent to the guide; and
  - a tensioning cam coupled to the axle and arranged between the first roller and the second roller, the tensioning cam defining a plurality of relief catches arranged for engagement with the brace, wherein the plurality of relief catches are each shaped to remain in selective engagement with the brace effected by concurrent movement of the axle and the tensioning cam to tension the belt against the first roller and the second roller while the keeper operates in the disengaged configuration.

2. The patient transport apparatus as set forth in claim 1, wherein the tensioning cam comprises a base portion arranged about the roller axis, and a follower portion arranged about a follower axis and at least partially defining the plurality of relief catches.

3. The patient transport apparatus as set forth in claim 2, wherein the follower axis is offset from the roller axis.

4. The patient transport apparatus as set forth in claim 3, wherein the follower axis is substantially parallel to the roller axis.

5. The patient transport apparatus as set forth in claim 2, wherein the plurality of relief catches are radially-spaced along the follower portion.

6. The patient transport apparatus as set forth in claim 5, wherein the plurality of relief catches are spaced equidistant from each other.

7. The patient transport apparatus as set forth in claim 2, wherein the plurality of relief catches includes:
- a first relief catch defining a first apex; and
- a second relief catch defining a second apex, the second relief catch disposed adjacent to the first relief catch along the follower portion of the tensioning cam;
- wherein engagement occurring between the first relief catch and the brace positions the first apex at a first reference distance from the roller axis and also positions the second apex at a second reference distance from the roller axis, the second reference distance being larger than the first reference distance.

8. The patient transport apparatus as set forth in claim 7, wherein the tensioning cam and the axle move concurrently away from the second rail end of the rail as the brace comes out of engagement with the first relief catch and comes into engagement with the second relief catch in response to a rotational force applied to the axle while the keeper operates in the disengaged configuration.

9. The patient transport apparatus as set forth in claim 1, wherein the plurality of relief catches each have a substantially arc-shaped profile.

10. The patient transport apparatus as set forth in claim 1, further including a spacer operatively attached to the axle and supporting the first roller and the second roller for rotation about the roller axis.

11. The patient transport apparatus as set forth in claim 10, wherein the tensioning cam is keyed to the axle such that the tensioning cam and the axle rotate concurrently about the roller axis in response to applied rotational force.

12. The patient transport apparatus as set forth in claim 11, wherein one of the axle and the tensioning cam defines a key feature, and the other of the axle and the tensioning cam defines a keyway feature with a profile that is complimentary to the key feature.

13. The patient transport apparatus as set forth in claim 1, wherein the guide defines a slot supporting the axle for movement relative to the rail while the keeper operates in the disengaged configuration.

14. The patient transport apparatus as set forth in claim 1, wherein the keeper is disposed in threaded engagement with the axle to operate in the engaged configuration when the keeper is tightened along the axle to prevent the axle from moving relative to the rail, and to operate in the disengaged configuration when the keeper is loosened along the axle to permit movement of the axle relative to the rail.

15. The patient transport apparatus as set forth in claim 1, wherein the tensioning cam has a cam radius and the first roller and the second roller each have a roller radius, and wherein the cam radius is greater than the roller radius.

16. A patient transport apparatus configured to transport a patient along stairs, the patient transport apparatus comprising:

a support structure;

a track assembly pivotably coupled to the support structure, the track assembly comprising:

a rail defining a first rail end and a second rail end;

an axle defining a roller axis and having a non-circular profile;

a first roller and a second roller each supported for rotation about the roller axis adjacent to the first rail end of the rail, wherein the first roller is spaced from the second roller along the roller axis;

a belt disposed in engagement with the first roller and the second roller and arranged for movement relative to the rail in response to rotation of the first roller and the second roller about the roller axis;

a guide supporting the axle for movement relative to the rail;

a keeper coupled to the axle and operable between a disengaged configuration to permit movement of the axle relative to the rail, and an engaged configuration to restrict movement of the axle relative to the rail;

a brace operatively attached to the rail adjacent to the guide; and a tensioning cam defining a keyway arranged between the first roller and the second roller with the axle disposed in the keyway and rotationally fixed for concurrent rotation therewith, the tensioning cam defining a plurality of relief catches arranged for engagement with the brace, wherein the plurality of relief catches are each shaped to remain in selective engagement with the brace effected by concurrent rotation about the roller axis of the axle and the tensioning cam to tension the belt against the first roller and the second roller while the keeper operates in the disengaged configuration.

17. The patient transport apparatus of claim 16, wherein the non-circular profile of the axle is further defined as a semi-circular profile with a flat surface and the keyway of the tensioning cam has a complementary profile.

* * * * *